United States Patent
Hori et al.

(10) Patent No.: US 9,087,291 B2
(45) Date of Patent: Jul. 21, 2015

(54) IMAGE PROCESSING APPARATUS AND METHOD SETTING THRESHOLDS OF DITHER PATTERNS BASED ON DENSITY RANGE AND GENERATING BINARY DATA DEPENDING ON THRESHOLDS OF TARGET PIXELS

(71) Applicant: CANON KABUSHIKI KAISHA, Tokyo (JP)

(72) Inventors: Shinjiro Hori, Yokohama (JP); Nobutaka Miyake, Yokohama (JP); Akitoshi Yamada, Yokohama (JP); Fumitaka Goto, Tokyo (JP); Ryosuke Iguchi, Kawasaki (JP); Hidetsugu Kagawa, Kawasaki (JP); Tomokazu Ishikawa, Yokohama (JP); Kouta Murasawa, Yokohama (JP); Hiromitsu Akiba, Yokohama (JP); Junichi Nakagawa, Tokyo (JP); Senichi Saito, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/495,740

(22) Filed: Sep. 24, 2014

(65) Prior Publication Data
US 2015/0092241 A1    Apr. 2, 2015

(30) Foreign Application Priority Data
Oct. 1, 2013    (JP) .................................. 2013-206325

(51) Int. Cl.
*H04N 1/405*    (2006.01)
*G06K 15/02*    (2006.01)
(Continued)

(52) U.S. Cl.
CPC ............... *G06K 15/1881* (2013.01); *B41J 2/21* (2013.01); *G06K 15/102* (2013.01); *G06K 15/1878* (2013.01); *G06K 2215/0094* (2013.01); *G06K 2215/101* (2013.01)

(58) Field of Classification Search
None
See application file for complete search history.

(56) References Cited

U.S. PATENT DOCUMENTS 5,521,990 A    5/1996    Ishizawa
5,673,121 A *  9/1997    Wang ........................... 358/3.06
(Continued)

FOREIGN PATENT DOCUMENTS

JP    2009-177852    6/2009

OTHER PUBLICATIONS

U.S. Appl. No. 14/495,736, filed Sep. 24, 2014.
(Continued)

*Primary Examiner* — Scott A Rogers
(74) *Attorney, Agent, or Firm* — Fitzpatrick, Cella, Harper & Scinto

(57) ABSTRACT

An image processing apparatus includes a generation unit; wherein a first dither pattern and a second dither pattern have same threshold values that are set for same pixels in a first gradation range, and have different threshold values that are set for same pixels in a second gradation range that exceeds the first gradation range; and the generation unit sets a first threshold value for forming dots of the first dither pattern, and generates a first binary data according to whether or not a threshold value corresponding to a target pixel of the first dither pattern is included in the first threshold value, and sets a second threshold value for forming dots of the second dither pattern, and generates a second binary data according to whether or not a threshold value corresponding to a target pixel of the second dither pattern is included in the second threshold value.

20 Claims, 20 Drawing Sheets

(51) Int. Cl.
  *G06K 15/10* (2006.01)
  *B41J 2/21* (2006.01)
  *H04N 1/409* (2006.01)
  *H04N 1/52* (2006.01)
  *H04N 1/58* (2006.01)

(56) References Cited

U.S. PATENT DOCUMENTS

| | | | |
|---|---|---|---|
| 5,822,462 A | 10/1998 | Miyake | |
| 5,864,638 A | 1/1999 | Ishizawa | |
| 5,966,507 A * | 10/1999 | Lin | 358/1.9 |
| 6,546,145 B1 | 4/2003 | Miyake | |
| 6,750,983 B1 | 6/2004 | Miyake | |
| 6,804,419 B1 | 10/2004 | Miyake | |
| 6,824,240 B2 | 11/2004 | Kusakabe | |
| 6,867,884 B1 | 3/2005 | Rozzi | |
| 6,954,542 B2 | 10/2005 | Miyake | |
| 7,099,046 B2 | 8/2006 | Yamada | |
| 7,102,791 B2 * | 9/2006 | Hirano et al. | 358/3.13 |
| 7,312,901 B2 | 12/2007 | Yamada | |
| 7,548,346 B2 | 6/2009 | Yamada | |
| 7,672,011 B2 | 3/2010 | Kato | |
| 7,855,809 B2 | 12/2010 | Kato | |
| 7,859,723 B2 | 12/2010 | Yamada | |
| 7,929,156 B2 * | 4/2011 | Kakutani | 358/1.9 |
| 7,965,418 B2 | 6/2011 | Yamada | |
| 8,215,741 B2 * | 7/2012 | Asai | 358/3.13 |
| 8,326,062 B2 * | 12/2012 | Chang et al. | 382/237 |
| 8,379,271 B2 * | 2/2013 | Kakutani | 358/3.13 |
| 8,482,800 B2 * | 7/2013 | Goto et al. | 358/1.9 |
| 8,503,031 B2 | 8/2013 | Kajihara | |
| 8,540,332 B2 * | 9/2013 | Shibata | 347/15 |
| 8,610,955 B2 * | 12/2013 | Goto et al. | 358/1.9 |
| 8,619,319 B2 | 12/2013 | Tsuchiya | |
| 8,830,530 B2 | 9/2014 | Sano | |
| 2002/0071140 A1 * | 6/2002 | Suzuki et al. | 358/455 |

OTHER PUBLICATIONS

U.S. Appl. No. 14/495,742, filed Sep. 24, 2014.

* cited by examiner

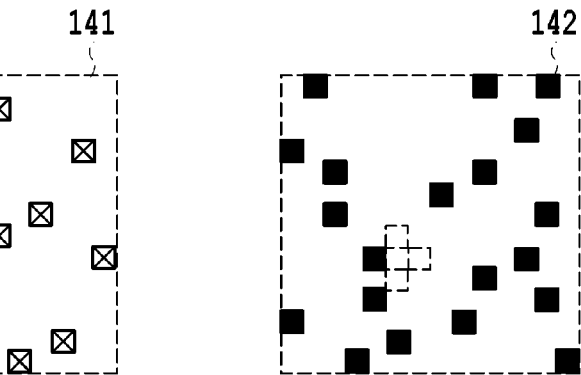
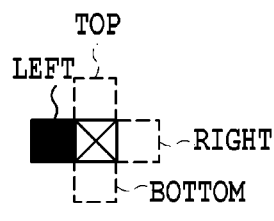
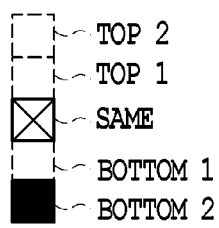
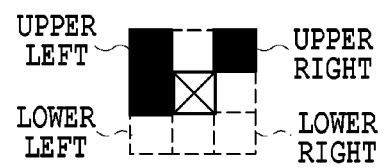
FIG.14

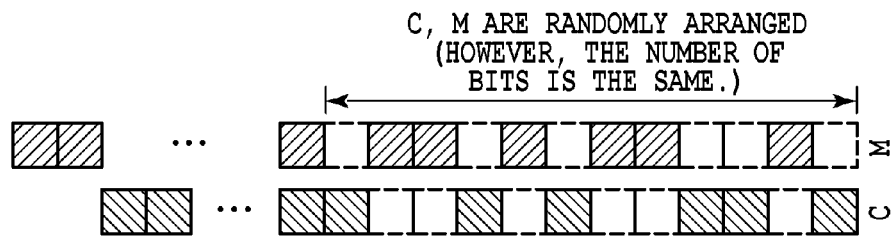
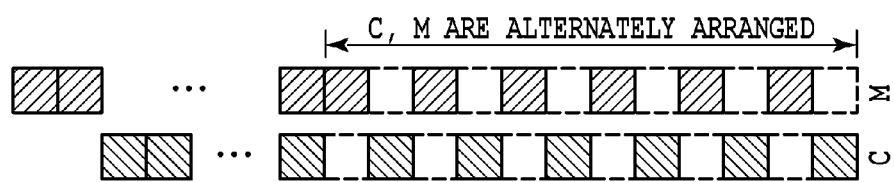
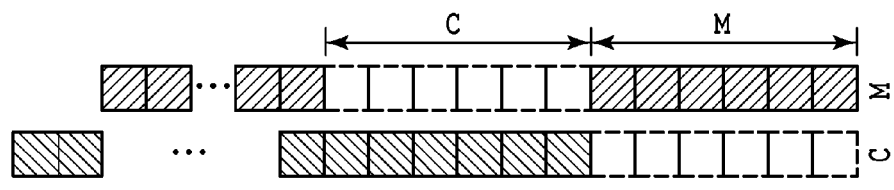
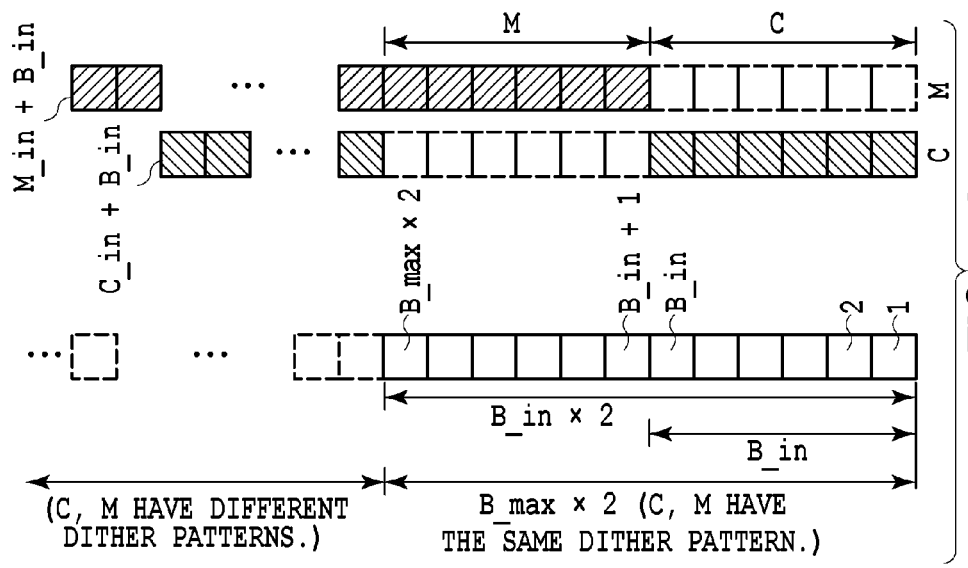

IMAGE PROCESSING APPARATUS AND METHOD SETTING THRESHOLDS OF DITHER PATTERNS BASED ON DENSITY RANGE AND GENERATING BINARY DATA DEPENDING ON THRESHOLDS OF TARGET PIXELS

BACKGROUND OF THE INVENTION

1. Field of the Invention

The present invention relates to a dithering method that can be applied to image processing by an image processing apparatus. Particularly, the present invention relates to a dithering method that is applied to quantization processing by an image processing apparatus that forms an image on a printing medium by ejecting ink from ejection openings.

2. Description of the Related Art

In an inkjet printing apparatus as a kind of image processing apparatus, printing data to be printed by the printing apparatus is generated by performing image processing such as quantization processing of image data that is inputted to the printing apparatus.

In this type of printing apparatus, in order to reduce the granular feeling of an image, the dot arrangement on the printing medium or the number of times ink is ejected may be set according to the size of the ink drops that are ejected from the ejection openings or according to the density of the ink. Moreover, in a color printing apparatus that uses plural colors of ink, the dot arrangement on the printing medium or the number of times ink is ejected may be set by taking into consideration the usage ratio of each ink color, the coverage of dots on the printing medium, or the overlapping of dots.

Japanese Patent Laid-Open No. 2009-177852 discloses an image processing apparatus that uses an error diffusion processing method for quantization processing. In this image processing apparatus, cyan dots and magenta dots are not printed in areas where both the density value of the cyan component and the density value of the magenta component indicate low density. On the other hand, cyan and magenta dots are independently printed in areas where both of the density values indicate intermediate to high density, and dots of the color having the largest density value are exclusively printed in areas where only one of the density values indicates intermediate to high density.

In the case of the image processing apparatus disclosed in Japanese Patent Laid-Open No. 2009-177852, when performing quantization processing of the cyan color component data and when performing the quantization processing of the magenta color component data in this way, the dot arrangement of each color is determined by comparing the density value of the cyan component with the density value of the magenta component.

Moreover, U.S. Pat. No. 6,867,884 discloses a method that uses a dithering method for the quantization processing. In this method, a single dither mask is used in common for black, cyan, magenta and yellow.

In the method disclosed in U.S. Pat. No. 6,867,884, threshold values inside the dither mask are taken to be the dot arrangement range, and the dot arrangements used are assigned in order for the input gradation values for each color. Then, the printed dots (1) or non-printed dots (0) are set by comparing the threshold values and input gradation values that were newly set for the respective assigned dot arrangements. As a result, in the method disclosed in U.S. Pat. No. 6,867,884, black, cyan and magenta dots are arranged without overlapping.

However, in the image processing apparatus disclosed in Japanese Patent Laid-Open No. 2009-177852, error diffusion processing is performed while referencing the density values of other ink color components, so the processing load in error diffusion processing that originally has a large processing load is further increased. As a result, when performing the error diffusion processing using hardware, the comparator, subtracter, memory for temporarily storing error, and the like are also increased, which brings about an increase in cost of the apparatus. Moreover, when the error diffusion processing is performed using software, the load on the CPU is increased, so there is a problem in that the processing speed and printing speed are decreased.

In the method disclosed in U.S. Pat. No. 6,867,884, a single dither mask is used in common for each color, so even though it is possible to disperse the dot arrangement for plural ink colors on a printing medium without overlap, arranging the dots with no correlation is difficult. As a result, when an error such as a conveying error occurs, shifting between dot groups of each ink color in areas where the ink density is dense causes the coverage of dots on the printing medium to fluctuate, so there is a possibility that irregular density will occur.

SUMMARY OF THE INVENTION

The object of the present invention is to provide an image processing apparatus and method for image processing that are capable of outputting a high-quality image at high speed by processing having a comparatively small load, and so that a granular feeling is not noticeable in low-density areas, and so that density fluctuation in intermediate density areas does not have an adverse effect.

According to a first aspect of the present invention, there is provided an image processing apparatus, including:
 an acquisition unit configured to acquire first multi-value data and second multi-value data based on input image data; and
 a generation unit configured to generate first binary data and second binary data for printing dots by performing quantization processing using a dithering method on the first multi-value data and the second multi-value data; wherein
 a first dither pattern that is used for the first multi-value data and a second dither pattern that is used for the second multi-value data have same threshold values that are set for same pixels in a first gradation range, and have different threshold values that are set for same pixels in a second gradation range that exceeds the first gradation range; and
 the generation unit
 sets a first threshold value for forming dots of the first dither pattern based on the first multi-value data and the second multi-value data, and generates the first binary data according to whether or not a threshold value corresponding to a target pixel of the first dither pattern is included in the first threshold value, and
 sets a second threshold value for forming dots of the second dither pattern based on the second multi-value data and the first multi-value data, and generates the second binary data according to whether or not a threshold value corresponding to a target pixel of the second dither pattern is included in the second threshold value.

According to a second aspect of the present invention, there is provided an image processing apparatus, including:
 an acquisition unit configured to acquire first multi-value data and second multi-value data based on input image data;

a fractional data generation unit configured to generate first initial quantization data from the first multi-value data and first fraction data corresponding to fractions excluding the first initial quantization data from the first multi-value data, and generate second initial quantization data from the second multi-value data and second fraction data corresponding to fractions excluding the second initial quantization data from the second multi-value data; and a quantization data generation unit configured to generate first quantization data and second quantization data for printing dots by performing quantization processing using a dithering method on the first fraction data and the second fraction data; wherein a first dither pattern that is used for the first fraction data and a second dither pattern that is used for the second fraction data have same threshold values that are set for same pixels in a first gradation range, and have different threshold values that are set for same pixels in a second gradation range that exceeds the first gradation range; and the quantization data generation unit sets a first threshold value in the first dither pattern based on the first fraction data and the second fraction data, and generates the first quantization data based on whether or not the first fraction data is included in the first threshold value range, and based on the first initial quantization data; and sets a second threshold value in the second dither pattern based on the second fraction data and the first fraction data, and generates the second quantization data based on whether or not the second fraction data is included in the second threshold value, and based on the second initial quantization data.

According to a third aspect of the present invention, there is provided a method for image processing, including:

an acquisition step of acquiring first multi-value data and second multi-value data based on input image data; and a generation step of generating first binary data and second binary data for printing dots by performing quantization processing using a dithering method on the first multi-value data and the second multi-value data; wherein a first dither pattern that is used for the first multi-value data and a second dither pattern that is used for the second multi-value data have same threshold values that are set for same pixels in a first gradation range, and have different threshold values that are set for same pixels in a second gradation range that exceeds the first gradation range; and in the generation step, a first threshold value for forming dots of the first dither pattern is set based on the first multi-value data and the second multi-value data, and the first binary data is generated according to whether or not threshold value corresponding to a target pixel of the first dither pattern is included in the first threshold value range, and a second threshold value for forming dots of the second dither pattern is set based on the second multi-value data and the first multi-value data, and the second binary data is generated according to whether or not threshold value corresponding to a target pixel of the second dither pattern is included in the second threshold value range.

With the construction described above, high dispersibility of dots during one-color printing and two-color printing in the low-gradation range (first gradation range) is obtained, and dots do not overlap each other during the two-color printing. Moreover, by causing dot overlap to occur in the intermediate-gradation range (second gradation range), it is possible to reduce fluctuation of the printing density when shifting of the printing position occurs. Therefore, with the present invention, a high-quality image in which a granular feeling in low density areas is not noticeable, and density fluctuation in intermediate-density areas does not have a negative effect can be output at high speed by processing having a comparatively small load.

Further features of the present invention will become apparent from the following description of exemplary embodiments (with reference to the attached drawings).

BRIEF DESCRIPTION OF THE DRAWINGS

FIG. 14 is a drawing for explaining examples of histogram evaluation values;

FIG. 18A is a drawing illustrating threshold values and dot arrangement;

FIG. 18B is a drawing illustrating threshold values and dot arrangement;

FIG. 18C is a drawing illustrating threshold values and dot arrangement;

FIG. 18D is a drawing illustrating threshold values and dot arrangement;

DESCRIPTION OF THE EMBODIMENTS

Hereinafter, an exemplary embodiment according to the present invention will be in detail described with reference to the accompanying drawings.

First Embodiment

Figure 1:
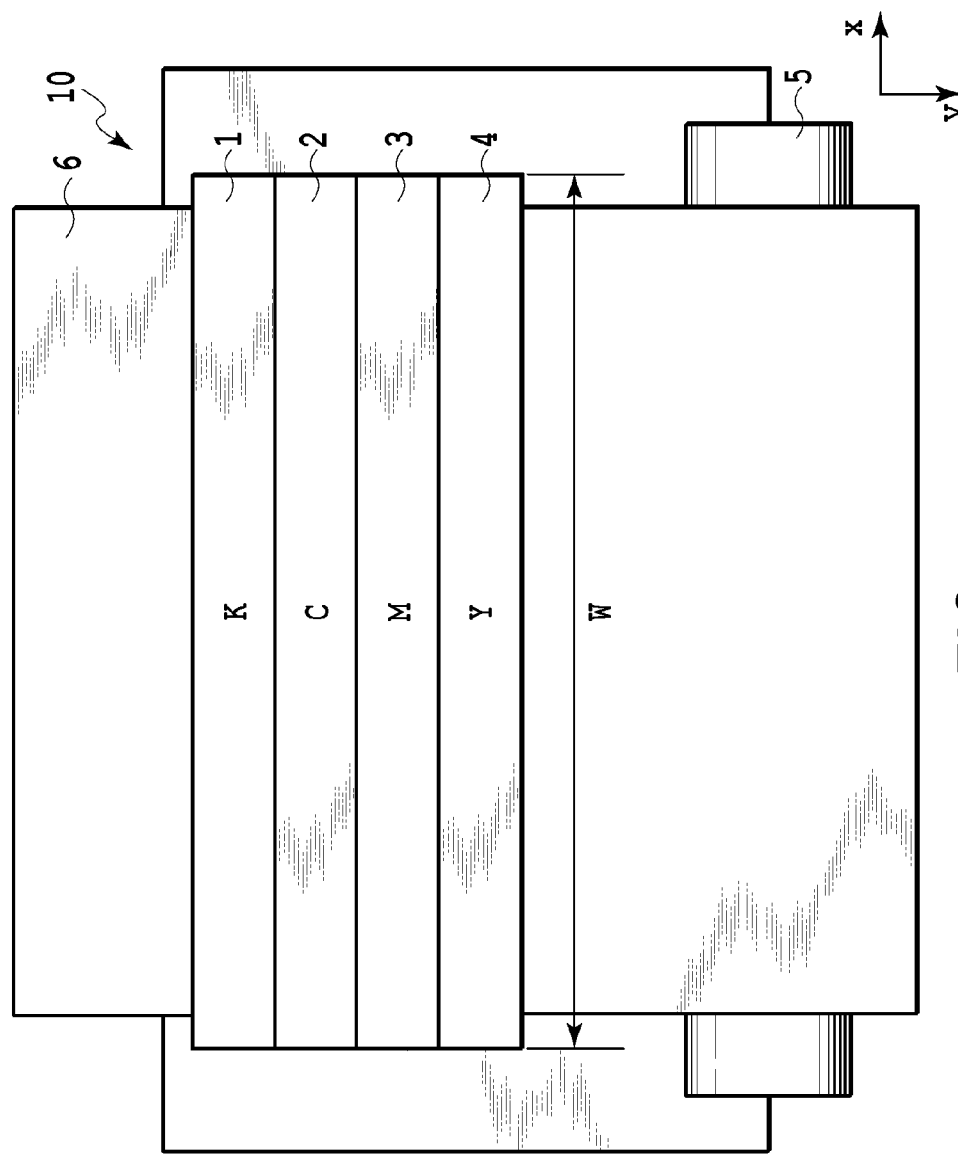
FIG. 1 is a drawing that illustrates the internal construction of an inkjet printing apparatus.

FIG. 1 is a drawing illustrating the internal construction of a full-line type inkjet printing apparatus 10 (hereafter, referred to as a "printing apparatus 10") that can be applied as the image processing apparatus of the present invention. As illustrated in FIG. 1, printing heads 1 to 4 and a conveying roller 5 are arranged in the printing apparatus 10. Although not illustrated in FIG. 1, plural ejection opening arrays in which plural ejection openings are arranged in the X direction are provided in the printing heads 1 to 4 on surfaces that face the printing medium 6.

In this embodiment, black (K) ink is ejected from the ejection openings of the printing head 1, cyan (C) ink is ejected from the ejection openings of the printing head 2, magenta (M) ink is ejected from the ejection openings of the printing head 3, and yellow (Y) ink is ejected from the ejection openings of the printing head 4.

The ink that is ejected from each ejection opening is applied to the printing medium 6. The printing medium 6 to which the ink is applied is held between the conveying roller 5 and pinch roller (not illustrated in the figure) that is driven by the conveying roller 5, and is conveyed in the conveying direction (Y direction in the figure) according to the rotation of the conveying roller 5. An image is formed on the printing medium 6 by applying the ink to the printing medium 6 and conveying the printing medium 6.

Figure 2:
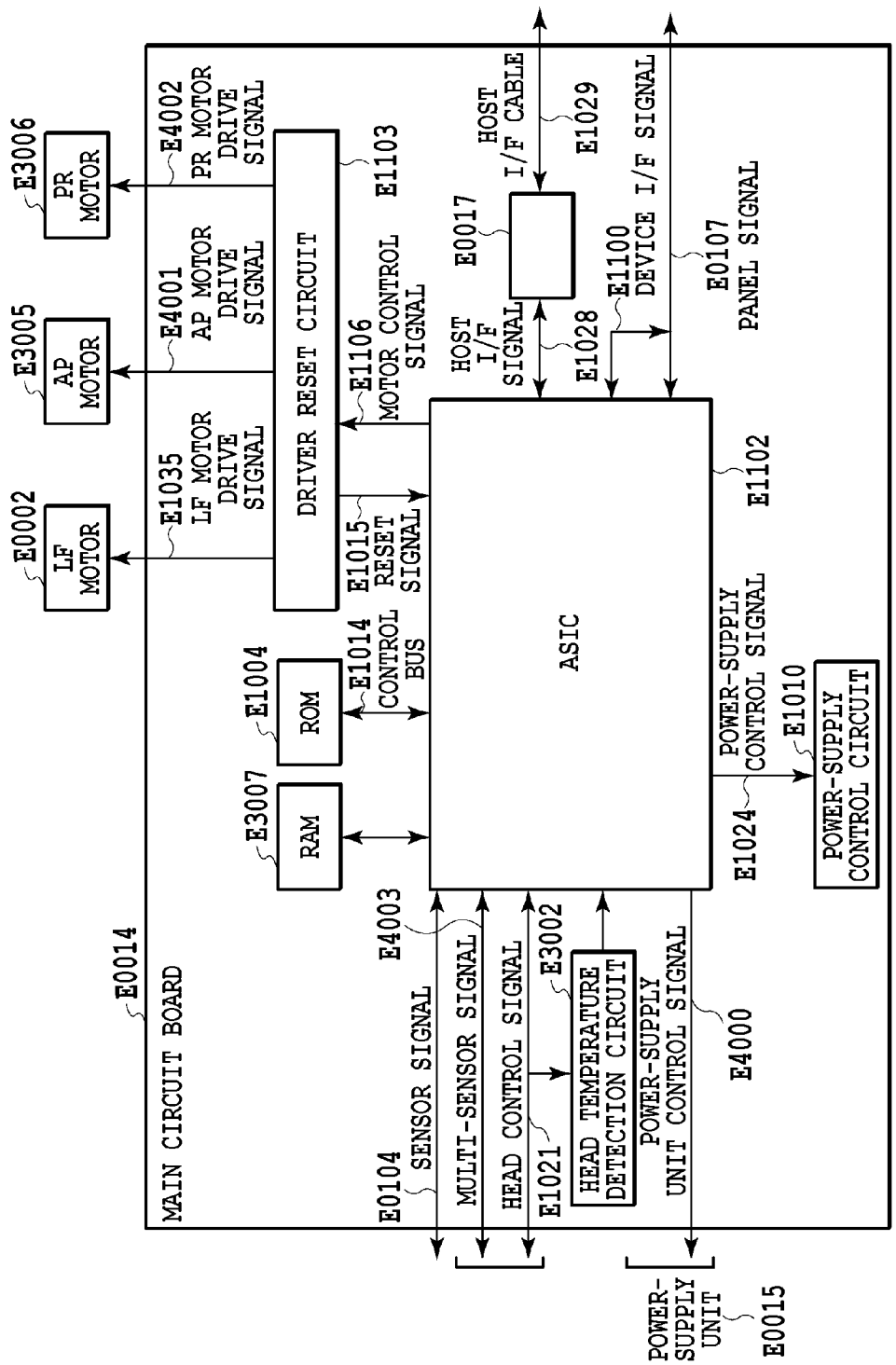
FIG. 2 is a block diagram illustrating the internal construction of a printer engine.

FIG. 2 is a block diagram illustrating the internal construction of a printer engine of this embodiment.

An ASIC E1102 that will be the engine of the printing apparatus 10 is provided on a main circuit board E0014, and this ASIC E1102 reads a program that is stored in a ROM E1004 by way of a control bus E1014, and performs overall control of the printing apparatus 10 according to that program. When doing this, a RAM E3007 is used as a data buffer for printing, a received data buffer for the ASIC E1102 or host I/F signals E1028, or used as a work area required for various control operations.

For example, the ASIC E1102 transmits/receives sensor signals E0104 and multi-sensor signals E4003 to/from various sensors and multi-sensors. Moreover, the ASIC E1102 detects panel signals E0107 that are output from a power key, resume key or the like on an externally mounted panel. Furthermore, according to the data input state from the host I/F E0017, the ASIC E1102 performs various logical operations and conditional judgments, controls each of the components, and performs control for driving the inkjet printing apparatus.

A driver-reset circuit E1103 drives various motors according to motor-control signals E1106 from the engine ASIC E1102. More specifically, the driver-reset circuit E1103 generates an LF motor drive signal E1035, and drives an LF motor E0002 for rotating the conveying roller 5 and discharging roller. Furthermore, the driver-reset circuit E1103 generates an AP motor drive signal E4001, and drives an AP motor E3005 for performing suction recovery of the printing heads. Furthermore, the driver-reset circuit E1103 generates a PR motor drive signal E4002, and drives a PR motor E3006.

The driver-reset circuit E1103 of this embodiment has a power-supply circuit, and supplies the necessary power to the main circuit board E0014, a front panel that is located on the outside of the apparatus, and the like. Furthermore, the driver-reset circuit E1103 detects when the power-supply voltage drops, and generates a reset signal E1015 to perform initialization.

A power-supply control circuit E1010 controls the power that is supplied to sensors having light-emitting elements according to a power-control signal E1024 from the ASIC E1102.

The host I/F E0017 transmits host I/F signals E1028 from the ASIC E1102 to a host I/F cable E1029 that is externally connected, and transmits signals from the host I/F cable E1029 to the ASIC E1102.

The necessary electric power is supplied from a power-supply unit E0015, and the supplied electric power undergoes voltage conversion as needed and is then supplied to each of the parts inside and outside the main circuit board E0014. The ASIC E1102 is connected to the power-supply unit E0015, and controls the low power-consumption mode and the like of the main apparatus by way of power-supply unit control signals E4000.

When performing a printing operation, the ASIC E1102 interfaces with the printing heads 1 to 4 using head control signals E1021, and controls the ejection operation. The head control signals E1021 are supplied to the printing heads 1 to 4 by way of a head-drive-voltage-modulation circuit and head connectors (not illustrated in the figure). On the other hand, various information from the printing heads 1 to 4 is also transmitted to the ASIC E1102. Of this information, temperature information about the printing heads 1 to 4 undergoes signal amplification by a head-temperature-detection circuit E3002 on the main circuit board E0014, after which the signals are inputted to the ASIC E1102 and used for various control judgment.

Figure 3:
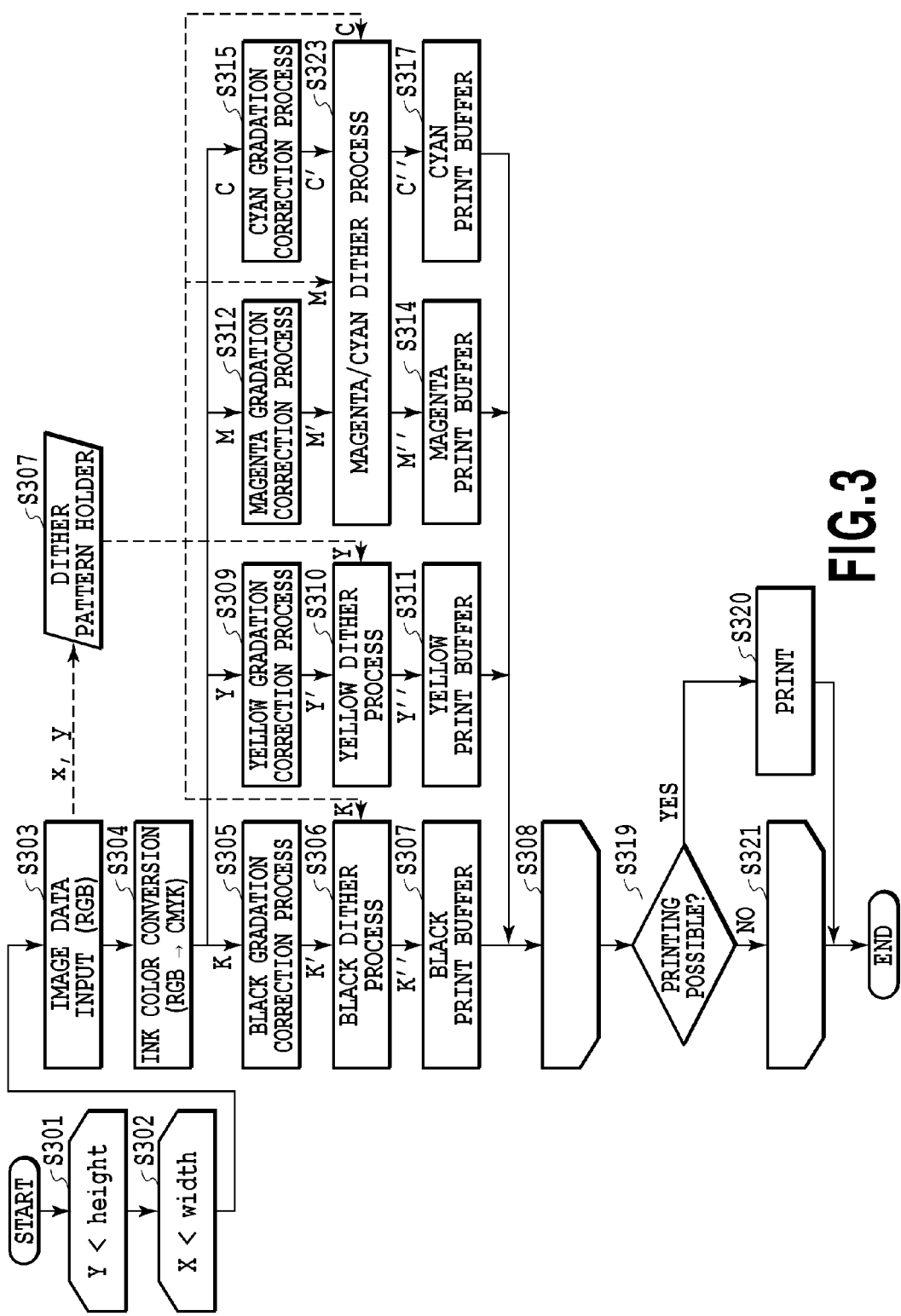
FIG. 3 is a flowchart illustrating the flow of image processing.

FIG. 3 is a flowchart illustrating the flow of image processing that is executed by the ASIC E1102 of this embodiment. In this embodiment, input data 402 (see FIG. 4B) that indicates the vertical size (number of pixels in the Y direction) and the horizontal size (number of pixels in the X direction) of an image is inputted to the printing apparatus 10 as the header of image data. In FIG. 3, loop processing for the Y direction is executed in steps S301 to S321, and loop processing for the X direction is executed in steps S302 to S308, so that processing is executed for all of the input data.

First, image data is inputted to the printing apparatus 10 by way of the host I/F cable E1029 (S303). The inputted image data that is received by the printing apparatus 10 is multi-value RGB data. This image data is converted by a color conversion circuit to multi-value image data CMYK that corresponds to the ink used by the printing apparatus (S304). More specifically, in this process, RGB multi-value data is converted to CMYK multi-value data by referencing a three-dimensional look-up table that was prepared in advance.

Next, gradation correction processing is performed for the data for each ink color (K, Y, M, C), and in this gradation correction processing, this data (K, Y, M, C) is converted to multi-value data (K', Y', M', C') (S305, S309, S312, S315). The gradation correction processing is a correction process that is performed on an input signal so that the density expressed on the printing medium is linear, and normally is performed by referencing a one-dimensional look-up table that was prepared in advance.

A dither process is performed on the gradation corrected multi-value data (K', Y', M', C') as quantization processing, and dot data (K", Y", M", C") is generated (S306, S310, S323).

Here, in the present invention, a dithering method is employed as the quantization processing. In other words, multi-value data for each pixel is converted to binary dot data that indicates printing (1) or no printing (0) by referencing a dither pattern in which a threshold value is set in advance for each pixel. More specifically, when the threshold values of corresponding pixels are not greater than the values of the multi-value data (K', Y', M', C'), the multi-value data is converted to data indicating printing (1), and when the threshold values are greater than the values of the multi-value data, the multi-value data is converted to data indicating no printing (0); the dot data being (K", Y", M", C").

In this embodiment, a different dither pattern for each ink color, or in other words, for each printing head is stored in a dither-pattern holder, and when performing the dither process, the dither patterns that are held in the dither-pattern holder are referenced (S307).

As illustrated in step S323 in FIG. 3, in this embodiment, dithering is performed simultaneously for two colors for multi-value magenta data (M') and multi-value cyan data (C') by referencing the respective values and also based on each other's values and not just the data's own value. This processing will be described in detail later.

Figure 4:
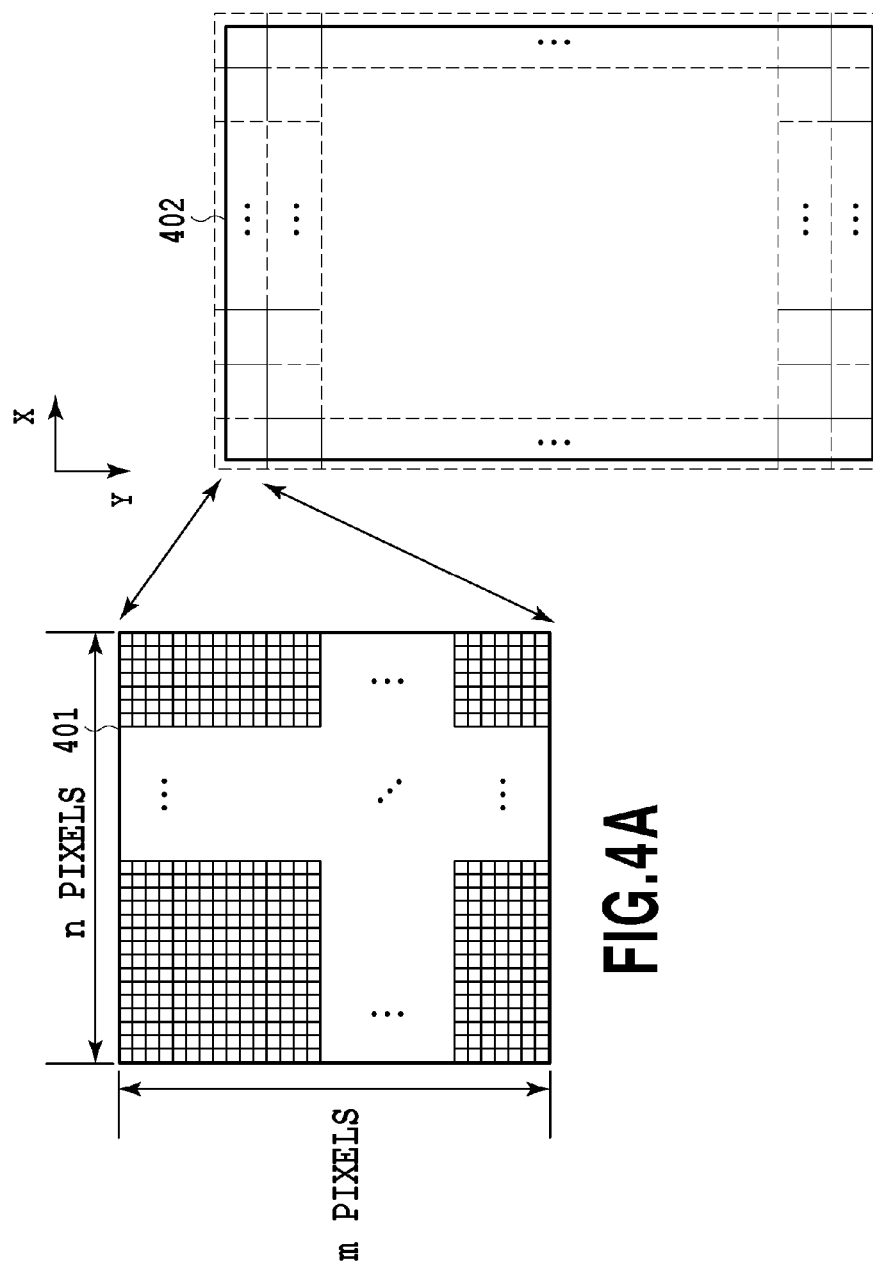
FIG. 4A is a drawing illustrating the input data and dither pattern arrangement.
FIG. 4B is a drawing illustrating the input data and dither pattern arrangement.

Here, the arrangement of a dither pattern will be explained. FIG. 4A and FIG. 4B are drawings illustrating the arrangement of the input data and the dither pattern, where FIG. 4A is a drawing illustrating the dither pattern 401, and FIG. 4B is a drawing illustrating the arrangement of the dither pattern 401 in the input data 402.

As illustrated in FIG. 4A and FIG. 4B, in the dither process, dithering is performed for the input data 402 using n×m (pixels) dither patterns that are repeatedly arranged in a line. As illustrated in FIG. 4B, in this embodiment, the dither patterns are arranged such that the origin (0, 0) of the input data 402, and the origin of the dither pattern 401 are offset. However, the arrangement of the dither patterns is not limited to this arrangement, and it is also possible to arrange the dither patterns such that the origin (0, 0) of the input data 402 and origin of the dither pattern 401 are aligned.

In the dither process, the threshold values that correspond to the coordinates of the input data 402 are read from the dither patterns and compared with the multi-value data (K', Y', M', C'), and then dot data (K", Y", M", C") is outputted. The threshold values of the dither pattern for each ink color are selected to correspond to the input coordinates (x, y) by referencing the dither pattern for each ink color that is held in the dither-pattern holder S307.

The dot data after quantization (K". Y", M", C") is stored in a print buffer for each color (S308, S311, S314, S317). After the dot data (print data) for plural preset lines is stored in the print buffer (YES in step S319), ink is applied to the printing medium 6 according to the conveying timing of the printing medium 6 and the printing timing of the printing heads 1 to 4 (S320).

On the other hand, when printing data for plural preset lines is not stored in the print buffer (NO in step S319), the processing described above is repeated until printing data for the set number of lines is stored in the print buffer. After printing of all lines (Y line portion) is finished, processing leaves the loop of step S321 and ends.

Figure 5:
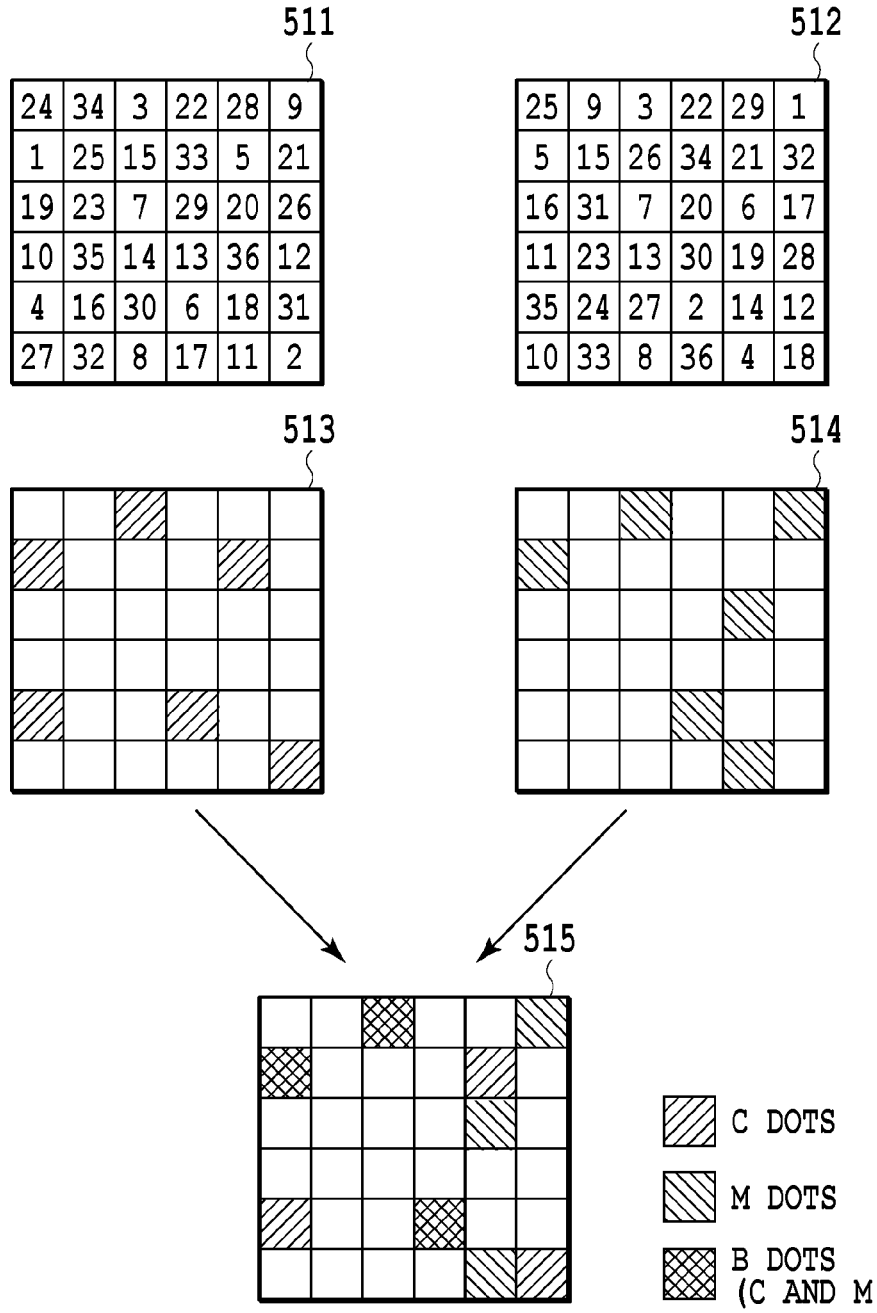
FIG. 5 is a schematic diagram for explaining the quantization result by a conventional method.

FIG. 5 is a drawing for explaining the quantization result by a conventional method. In the conventional method, dithering is not performed simultaneously for two colors for the multi-value magenta data M' and the multi-value yellow data Y' by referencing each other's values as in this embodiment (see step S323 in FIG. 3), but is performed for each color with no correlation.

FIG. 5 illustrates an example in which cyan binary data 513 is generated using the dither pattern 511, and magenta binary data 514 is generated using the dither pattern 512. Here, for simplification, the dither pattern area is illustrated as being 6 pixels×6 pixels.

In the dither pattern 511 including 6 pixels×6 pixels, a threshold value 1 to 36 is set for each individual pixel. Here, when multi-value data "6" is inputted for all 36 pixels, only pixels for which the set threshold value is not greater than "6" become print pixels (1), and in the binary data 513 in FIG. 5, the pixels indicated by diagonal lines correspond so these pixels. This is the same for the dither pattern 512 and the binary data 514 that was generated using that dither pattern 512.

In the data 515 that is obtained by overlapping the binary data 513 and 514, there are pixels that become print pixels for both colors (pixels indicated by checks in FIG. 5). These pixels become blue dots that result from overlapping cyan dots and magenta dots. Due to the existence of blue dots, the granular feeling of the image may increase.

The dither process of this embodiment that is performed for avoiding this will be explained. In this embodiment, processing for cyan and magenta will be explained, however, in the case of a color for which a granular feeling at low density is a concern, combinations of other colors could also be used. The method for creating dither patterns to be used in this embodiment will be explained with reference to FIG. 7 to FIG. 10, and the result will be explained with reference to FIG. 6A and FIG. 6B.

Figure 7:
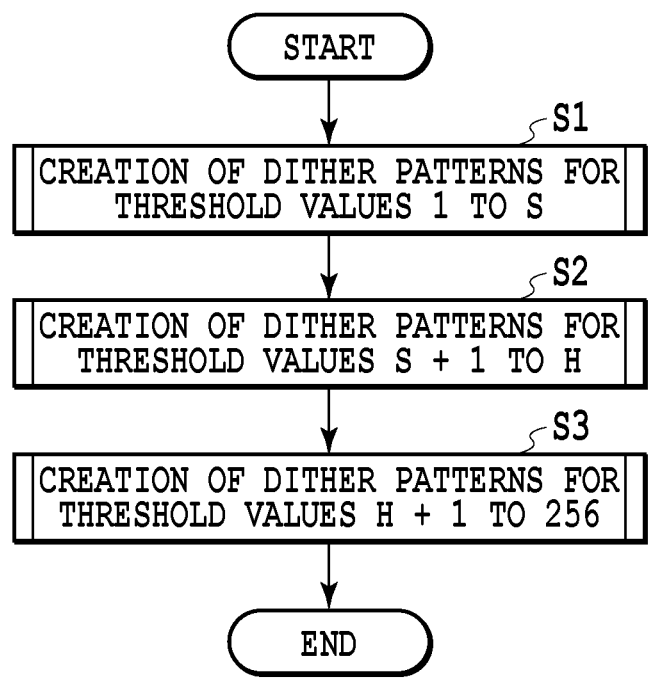
FIG. 7 is a flowchart for explaining a method for creating dither patterns.

FIG. 7 is a flowchart that explains a method for creating dither patterns that are used in this embodiment. In this embodiment, it is assumed that the multi-value data C', M' having undergone gradation correction has 256 gradations, and the data inputted for each pixel has a value 0 to 255. The threshold value that is set for each pixel in a dither pattern is a value 1 to 256, and dots are printed for pixels for which the values of the input data are not greater than the set threshold values. It is here assumed that the size of a dither pattern in this embodiment is 64 pixels×64 pixels, and individual threshold values 1 to 256 are set to each 16 pixels inside the 64 pixels×64 pixels dither pattern.

As seen in FIG. 7, in this embodiment, the threshold values 1 to 256 above are divided and set in three stages. In step S1, low-level threshold values (1 to S) are set in the 64 pixels×64 pixels dither pattern. The pixels for which low-level threshold values 1 to S are set are pixels for which dots are printed even for low-gradation data having low printing density. In the case of a low-density image that indicates gradation values in the range 0 to S, dots are printed for pixels for which threshold values are set that are equal to or less than those gradation values.

Figure 11:
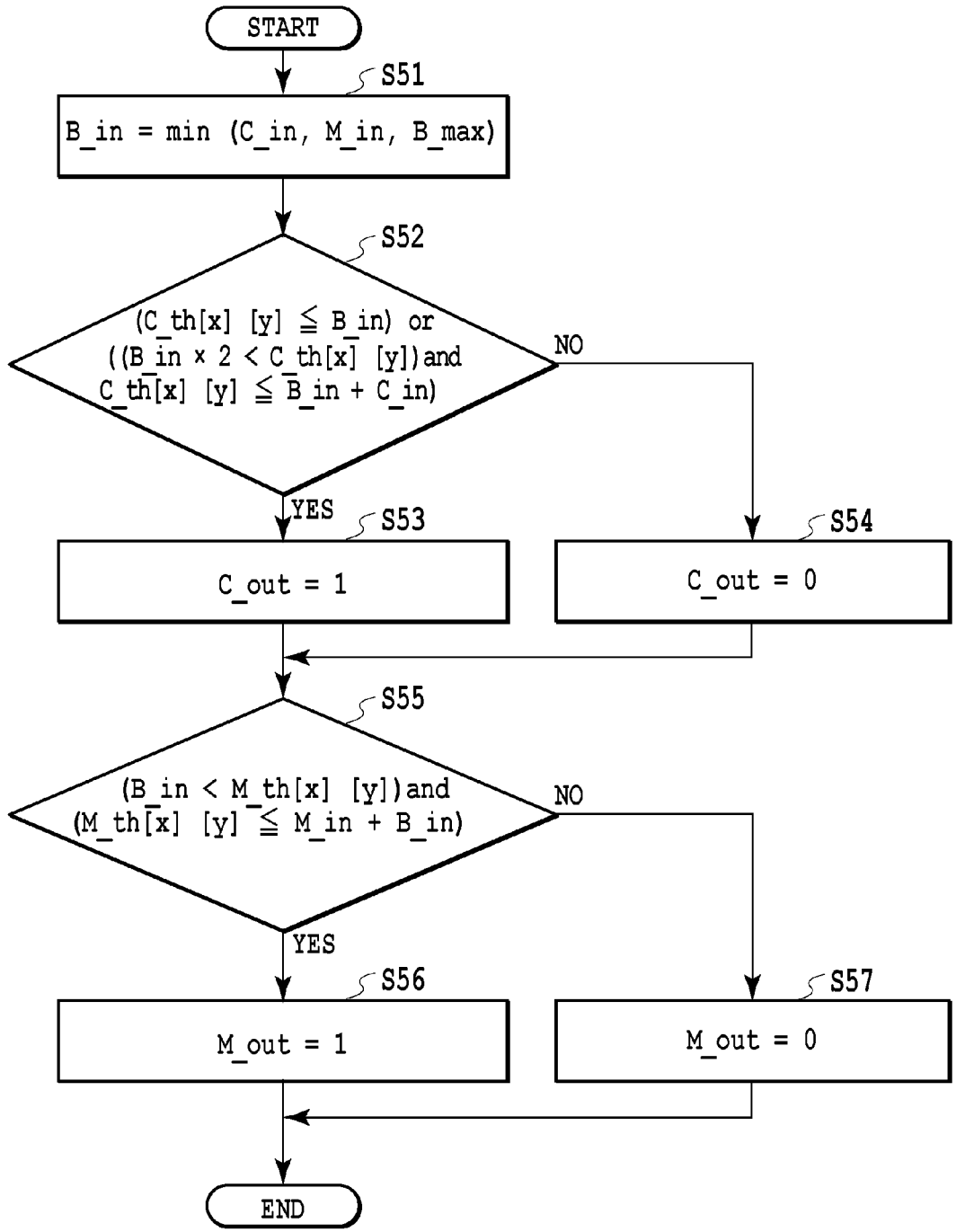
FIG. 11 is a flowchart illustrating the flow of the dither process.

Here, a common dither pattern is created such that the same threshold values are set for the same locations in the dither mask for cyan and in the dither mask for magenta. Referring to FIG. 11, the threshold value S preferably has a value that corresponds to B_max×2 that will be described later.

Continuing, in step S2, intermediate-level threshold values (S+1 to H) are set. Pixels for which intermediate-level threshold values S+1 to H are set are pixels for which dots are printed for data having an intermediate gradation or greater. In the case where the input image data corresponds to an image having intermediate density that indicates gradation values in the range S+1 to H, dots are printed for pixels for which threshold values that are equal to or less than those gradation values are set. Here, separate dither patterns are created so that different threshold values are set for the same locations in the dither mask for cyan and in the dither mask for magenta.

In step S3, high-level threshold values (H+1 to 256) are set for pixels for which threshold values were not set in step S1 or step S2. Pixels for which high-level threshold values H+1 to 256 are set are pixels for which dots are printed for high-gradation data having high density. In the case where the input image data corresponds to a high-density image that indicates gradation values within the range H+1 to 256, dots are printed for pixels for which threshold values that are equal to or less than those gradation values are set. Here as well, separate dither patterns are created so that different threshold values are set for the same locations in the dither mask for cyan and in the dither mask for magenta.

In steps S2 and S3, when threshold values are set so that dots do not overlap as much as possible during two-color printing, the robustness against shifting of the printing position becomes low compared to that of the low-level threshold values that are set in step S1. Therefore, in this embodiment, a method will be explained in which independent dot arrangements are used in each of the dither patterns so that it is possible for overlap dots of two colors to exist to a certain extent. Setting threshold values in the intermediate- to high-gradation range will be explained later with reference to FIG. 10.

Figure 8A:
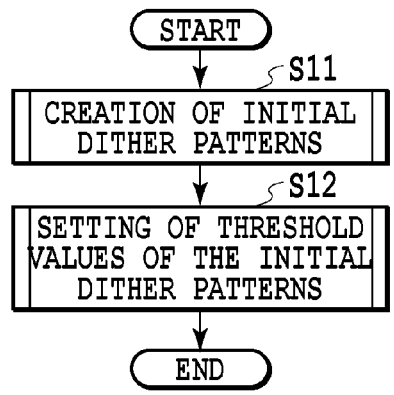
FIG. 8A is a flowchart for explaining each step in detail.
Figure 8B:
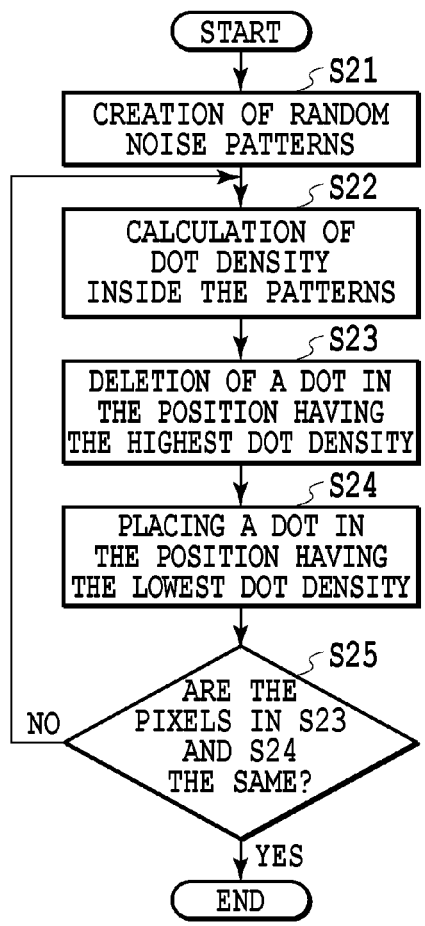
FIG. 8B is a flowchart for explaining each step in detail.
Figure 8C:
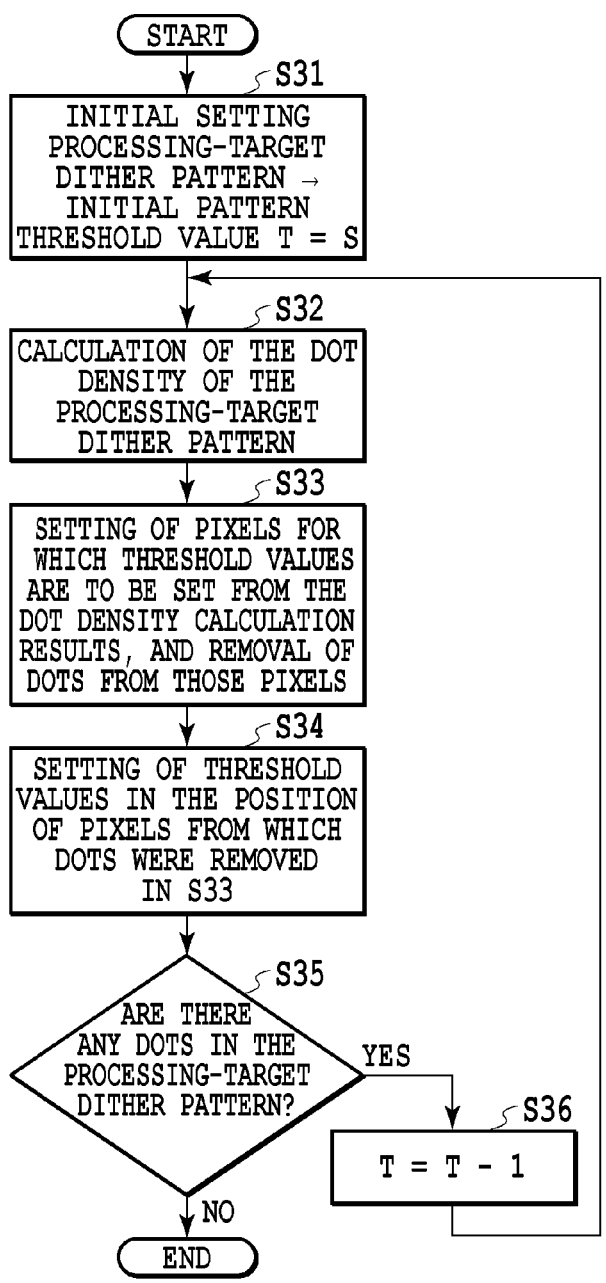
FIG. 8C is a flowchart for explaining each step in detail.

FIG. 8A to FIG. 8C are flowcharts for explaining each step in detail, and are flowcharts explaining in detail the process for setting low-level threshold values (1 to S). FIG. 8A is a flowchart for explaining in detail the processing in step S1 in FIG. 7. As illustrated in FIG. 8A, an initial dither pattern is created in step S11, and threshold values for the initial dither pattern are set in step S12.

FIG. 8B is a flowchart for explaining in detail the processing in step S11 in FIG. 8A. After this processing has started, first, in step S21, 16×2×(S+1) dots are set randomly inside 64 pixels×64 pixels. The low-level threshold values are set so that dots are arranged sufficiently separated in a state of high dispersibility. Therefore, threshold value S, which is the upper limit of the low-level threshold values, is preferably a value such that this kind of state can be maintained.

Figure 9A:
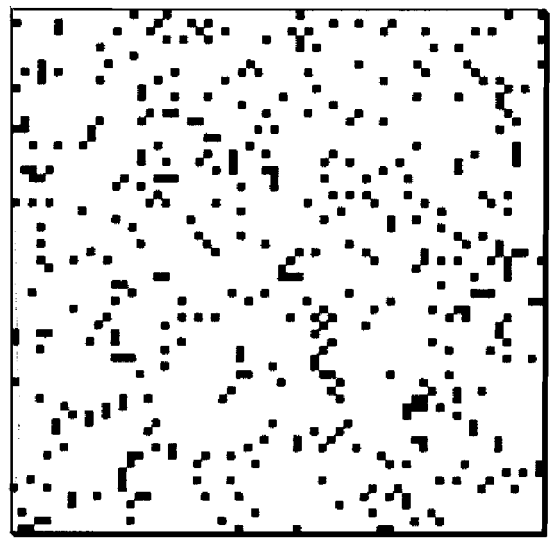
FIG. 9A is a drawing illustrating dot arrangement.
Figure 9B:
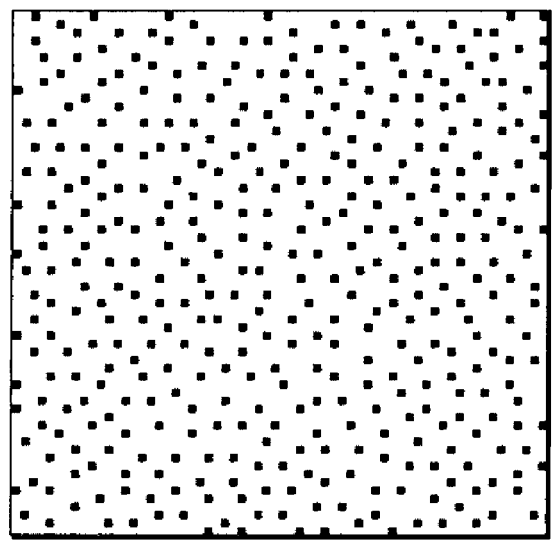
FIG. 9B is a drawing illustrating dot arrangement.

FIG. 9A and FIG. 9B are drawings illustrating dot arrangement, where FIG. 9A illustrates the dot arrangement state when S=11 (or in other words, when S+1=12). When S=11, 16×2×(11+1)=384 dots (black areas) are arranged inside the area.

Steps S22 to S24 in FIG. 8B are steps of performing a process to increase the dispersibility of the dot arrangement created in step S21. First, in step S22, a Gaussian filter is used to calculate Gaussian filter values for all of the pixels. Then, in step S23, one dot is removed from the location having the highest Gaussian filter value, or in other words, at the location determined to be "dense in dots". Next, in step S24, one dot is placed at the location having the lowest Gaussian filter value, or in other words, at the location determined to be "sparse in dots".

Here, a Gaussian filter was used as a way to express the density of dots, however, as long a parameter is used that can indicate the density of dots, a low-pass filter (LPF) or the like could also be used.

In step S25, it is determined whether or not the location from which the dot was removed in step S23 and the location to which the dot was placed in step S24 are the same location. When it is determined that both pixels are in the same location, this processing ends. However, when it is determined that the locations of both pixels do not coincide, it is determined that the dispersed state of dots is still not sufficient, so processing returns to step S22 and the processing of step S22 to step S25 is repeated. FIG. 9B is a drawing illustrating the dot arrangement of a state in which it was determined that both pixels are in the same location in step S25 in FIG. 7B. In the state illustrated in FIG. 9B, it can be seen that the dots are sufficiently dispersed when compared with the state illustrated in FIG. 9A.

FIG. 8C is a flowchart for explaining in detail the processing in step S12 in FIG. 8A. In step S12, threshold values are set using the initial dither pattern that was created in step S11. When doing this, optimal threshold values that improve the granular feeling are set for each gradation 0 to S.

First, in step S31, the initial dither pattern is set as the processing-target dither pattern. A threshold value T is initially set to S. Next, in step S32, the dot density is calculated for the dot pixel locations of the processing-target dither pattern. Here, among the dot pixel locations in the dither pattern to be processed, the evaluation value is increased for the location having the highest Gaussian filter value, or in other words, for the pixel location that are dense in dots.

In step S33, the dot of the pixel having the highest evaluation value is selected, and that dot is removed. Then, in step S34, the threshold value T for the pixel location where the dot was removed in step S33 is set to S.

In step S35, it is determined whether or not there are still dots remaining in the processing-target dither pattern that need to be processed. When there are dots remaining to be processed, the threshold value is decremented in step S36, after which processing returns to step S32. When there are no dots remaining, processing ends.

After going through the processing described above, the setting process for setting the low-level threshold values (1 to S) (first gradation range) in step S1 in FIG. 7 ends. The threshold values of the dither pattern by this processing are set in common for both the cyan dither pattern and the magenta dither pattern.

Figure 10:
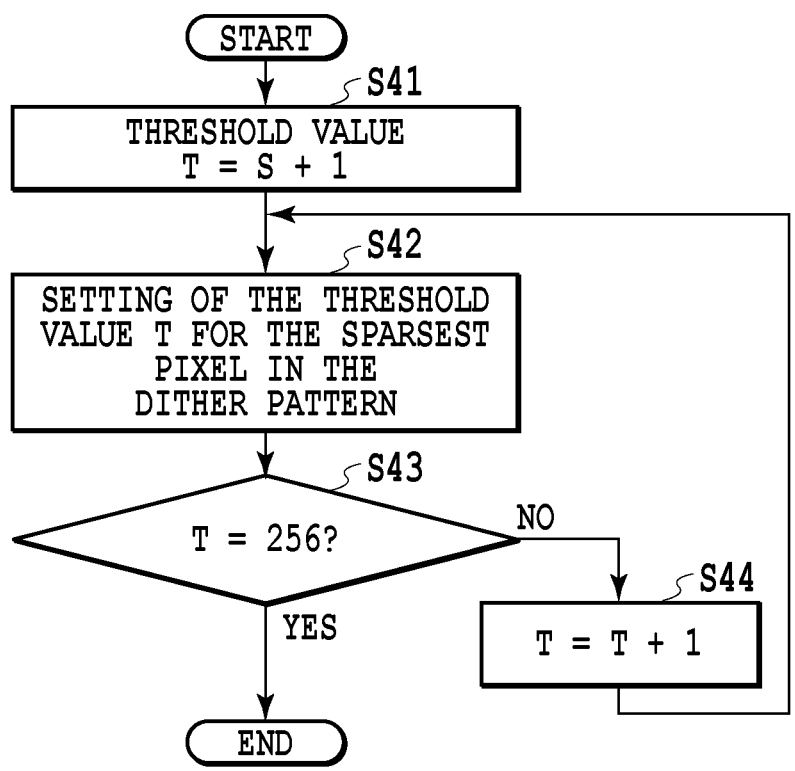
FIG. 10 is a flowchart illustrating the flow up to setting intermediate- to high-level threshold values.

Next, the processing for setting the intermediate-level threshold values (S+1 to H) and high-level threshold values (H+1 to 256) will be explained. FIG. 10 is a flowchart for explaining the process for setting the intermediate- to high-level threshold values (S+1 to 256) in the dither pattern in step S2 and step S3 in FIG. 7. Setting the intermediate- to high-level threshold values in step S2 and step S3 is performed individually for the cyan dither pattern and the magenta dither pattern, so the processing illustrated in FIG. 10 is performed for each color.

After this processing is started, first, in step S41, the threshold value T that is to be set next is set to T=S+1. In step S42, the threshold value T is set for the most "sparse" pixel from among the pixels for which a threshold value has not yet been set in the dither pattern.

In step S43, it is determined whether or not T=256, and when T<256, there are still threshold values to be set, so in step S44, the threshold value T is incremented, after which processing returns to step S42. On the other hand, in step S43, when T=256, all of the threshold values have been set, so this processing ends.

In this embodiment, the threshold values of the dither pattern were set in three stages in step S1 to step S3 in FIG. 7, however, in step S2, by taking H to be H=256, all of the threshold values can be set in the processing up to step S2.

By performing the processing described above, up to the low-level threshold values (1 to S) that correspond to the first gradation range, the same threshold values are set for the same locations in the cyan dither pattern and magenta dither pattern. In that case, even though processing is performed independently for cyan and magenta in step S2 after that, often the locations of the most "sparse" pixels coincide in both, and the locations for which threshold values were set independently also coincide for cyan and magenta. As a result, many of the cyan and magenta dots that are printed in the intermediate density area overlap each other, and an image having weak robustness occurs.

Therefore, the processing flow is as illustrated in FIG. 8C, however, when creating the cyan dither pattern and the magenta dither pattern, different methods for evaluating dense pixels in step S32 are used. More specifically, the evaluation methods differ such as by making the results differ by applying random numbers to the evaluation values during judgment, or by using different Gaussian filter parameters, which are the evaluation functions. Moreover, it is also possible to use other methods such as making the type of the evaluation function filter differ.

In this embodiment, when creating the dither pattern 621 and dither pattern 622 illustrated in FIG. 6A, up to threshold value 12, the threshold values are set in the same locations. Moreover, for threshold values 13 to 36, setting threshold values at different locations is also allowed to create the dither pattern 621 and dither pattern 622. In addition, in the dither process illustrated in step S323 in FIG. 3, the dot arrangement up to threshold value 12 is such that dots are printed in different threshold value ranges for cyan and magenta.

More specifically, when the multi-value data is 6, dots are printed for pixels for which the threshold values 1 to 6 are set for cyan, for example, and dots are printed for pixels for which the threshold values 7 to 12 have been set for magenta.

Hereafter, in the specification for this invention, for one multi-value data, a group of threshold value numbers that set that multi-value data to printing (1) will be called a threshold value range. In the example above, the threshold value range for cyan is 1 to 6, and the threshold value range for magenta is 7 to 12.

The dither process of this embodiment will be explained in more detail. FIG. 11 is a flowchart illustrating the flow of the dither process. Moreover, FIG. 6A and FIG. 6B are schematic drawings for explaining the quantization results of this embodiment.

In FIG. 11, C_in indicates multi-value data C' that has undergone gradation correction, M_in indicates multi-value data M' that has undergone gradation correction, B_max indicates the half value of the maximum value S of the portions where the threshold values of the dither pattern 621 and dither pattern 622 are common (here this is 6). C_Th [x] [y] indicates the threshold value of the pixel of interest (x, y) in the dither pattern 621, and M_Th[x] [y] indicates the threshold value of the pixel of interest (x, y) in the dither pattern 622. C_out indicates the cyan binary data 623, and M_out indicates the magenta binary data 624.

In the case illustrated in FIG. 6A, C_in=6, M_in=6 and B_max=6.

As illustrated in FIG. 11, first, in step S51, the minimum value B_in among the inputted C_in, M_in and B_max is acquired.

Next, in step S52, it is determined whether or not to print cyan dots. Here, whether or not to print is determined by whether or not the threshold value of the pixel of interest C_Th[x] [y] satisfies either of the conditions below.
Condition 1: B_in or less (specified value or less)
Condition 2: Greater than B_in (specified value)×2, and equal to or less than C_in+B_in It is possible to restate condition 2 as being from (B_in× 2)+1 or greater to C_in+B_in or less. When the threshold value of C_Th [x] [y] satisfies condition 1 or condition 2, processing advances to step S53 and the cyan binary data C_out=1. When the threshold value of C_Th [x] [y] does not satisfy condition 1 or condition 2, processing advances to step S54, and the cyan binary data C_out=0.

As a result, in the conventional method, the threshold value range from B_in+1 to C_in in which dots were applied is shifted to the large threshold value side by the amount B_in.

Next, in step S55, it is determined whether or not to print magenta dots. Here, whether or not to print is determined according to whether or not the threshold value of the pixel of interest M_Th [x] [y] satisfies the condition below.
Condition 3: Greater than B_in and equal to or less than M_in+B_in When the threshold value of M_Th [x] [y] satisfies condition 3, processing advances to step S56, and magenta binary data M_out=1. When threshold value of M_Th [x] [y] does not satisfy condition 3, processing advances to step S57, and magenta binary data M_out=0.

In this case as well, in the conventional method, the threshold value range from 1 to M_in in which dots are applied is shifted to the large threshold value side by the amount B_in. The dither process of this embodiment is performed by the processing of step S51 to step S57.

In the case illustrated in FIG. 6A, in step S51 B_in=6. In step S52 to step S54, the cyan binary data 623 for the pixels having threshold values 1 to 6 becomes C_out=1. In step S55 to step S57, the magenta binary data 624 for the pixels having threshold values 7 to 12 becomes M_out=1.

In this embodiment, the same threshold value matrix is used for cyan and magenta, however, the threshold value ranges are different from each other, so in low-density areas such as this, cyan dots and magenta dots are not printed for the same pixels. Therefore, as illustrated in FIG. 6A, in data 625, which is the overlapping of cyan binary data 623 and magenta binary data 624, it is possible to suppress the occurrence of blue dots which is the overlapping of cyan dots and magenta dots, and thus it is possible to suppress a granular feeling.

Next, the dot arrangement in the intermediate gradation range will be explained. FIG. 6B illustrates overlapped data 635 of cyan binary data 633 and magenta binary data 634 for the case when C_in=13 and M_in=13 for all of the input data. Here, the same dither patterns as in FIG. 6A are used.

When following the processing flow in FIG. 11, in step S51 B_in=6. Normally, when the input data C_in and M_in are both "13", the binary data for pixels having threshold values "1" to "12" indicates print "1". However, in this embodiment, in step S52 to step S54, the cyan threshold value range that was "1" to "12" is shifted to "1" to "6" and "13" to "19". As a result, the cyan binary data 633 for pixels having threshold values 1 to 6 and threshold values 13 to 19 becomes C_out=1.

On the other hand, in step S55 to step S57, the magenta threshold value range that was "1" to "12" is changed to "7" to "19". As a result, the magenta binary data 634 for pixels having threshold values 7 to 19 becomes M_out=1. As illustrated in FIG. 6B, in the overlapped data 635 of cyan binary data 633 and magenta binary data 634, there are areas where cyan dots and magenta dots overlap. Therefore, the ratio of the number of pixels for which both cyan and magenta dots are printed is larger in the intermediate-gradation range than in the low-gradation range.

In this way, in this embodiment, dither patterns are used so that there is exclusive dot arrangement in the low-gradation range and so that there is independent dot arrangement that allows overlapping dots in the intermediate- to high-gradation range.

By combining the dither patterns created by the method described above with the dithering method above, high dispersibility of dots during one-color printing and two-color printing in the low-gradation range is obtained, and dots do not overlap each other during two-color printing. Moreover, by causing dot overlap to occur in the intermediate- to high-gradation ranges it is possible to reduce fluctuation of the printing density when shifting of the printing position occurs. As described above, in this embodiment, uneven density is suppressed, and a high-quality image in which a granular feeling and insufficient density do not have a negative effect can be output at high speed by processing having a comparatively small load.

Variation

A variation of the first embodiment will be explained. In this variation, reducing fluctuation in density due to a shift in the printing position in the intermediate-gradation range is emphasized, and creation of dither patterns that further reduce density fluctuation will be explained. In this variation, the method for creating dither patterns in the intermediate- to high-gradation range is different than in the first embodiment. The other parts are the same as in the first embodiment, so an explanation of those parts is omitted.

Figure 12A:
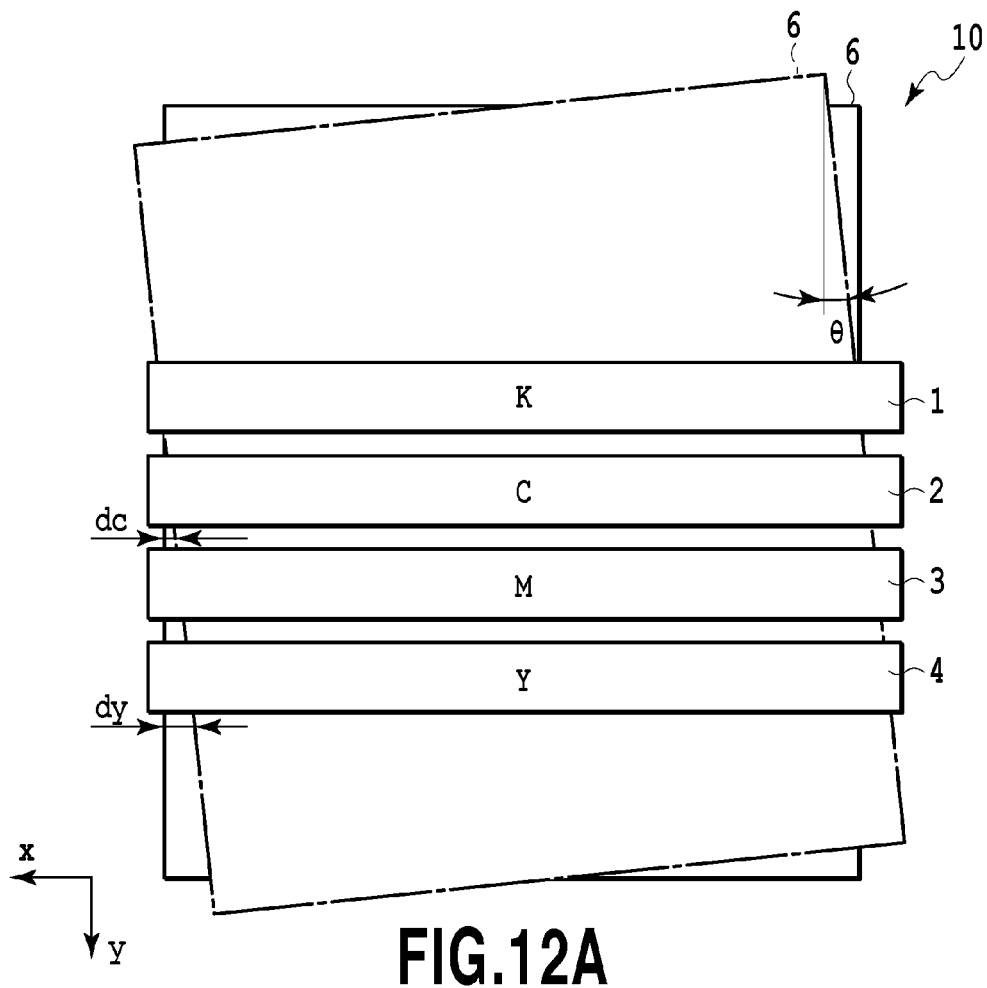
FIG. 12A is a schematic diagram for explaining shifting of the printing position.
Figure 12B:
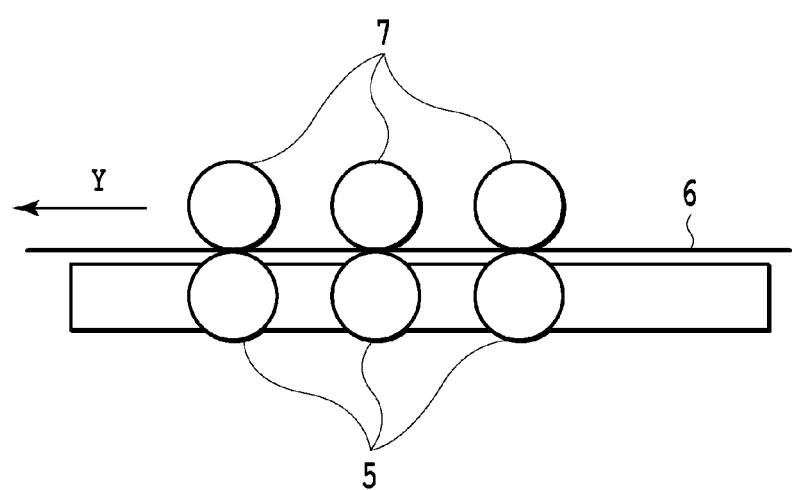
FIG. 12B is a schematic diagram for explaining shifting of the printing position.

First, shifting of the printing position in a printing apparatus 10 that uses full-line type printing heads will be explained. FIG. 12A and FIG. 12B are schematic drawings for explaining shifting of the printing position, where FIG. 12A is a top view illustrating the state in which the position of the printing medium 6 has shifted from the state illustrated in FIG. 1, and FIG. 12B is a cross-sectional view of FIG. 12A.

In FIG. 12A, the position of the printing medium 6 illustrated by the solid line is the desired position. As illustrated in FIG. 12A, the printing medium 6 that is illustrated by the dashed line is shifted and conveyed from the desired position by an angle θ. This kind of skew of the printing medium 6 occurs due to assembly error of the position of a positioning member that regulates the position in the width direction (X direction) of the printing medium 6, due to a difference in the coefficient of friction of the conveying rollers 5, or the like, however, eliminating such manufacturing tolerance is difficult.

As illustrated in FIG. 12A, when the printing medium 6 that is skewed by the angle A is conveyed, the printing position of the printing head 2 shifts in the X direction by a distance dc from the printing position of the printing head 1. The printing position of the printing head 4 shifts in the X direction by a distance dy from the printing position of the printing head 1. The distance dc is greater than the distance dy.

Moreover, as illustrated in FIG. 12B, the printing medium 6 is held and conveyed between the plural conveying rollers 5 and pinch rollers 7 that are driven by the conveying rollers 5. When the shapes of these rollers change over time, the amount that the printing medium 6 is conveyed in the Y direction due to one rotation of the rollers is not fixed, so there is a possibility that the printing position of each of the printing heads will shift in the Y direction.

In this way, in a printing apparatus 10 that uses the plural full-line type printing heads, the relative printing position of the printing heads may shift in the X direction and Y direction. There is a possibility that in an image that is printed in this state, the dot arrangement will change and the density and hue of the image will change compared with that in an image that was printed on a printing medium 6 that was conveyed to the desired position.

This kind of shift in the relative printing position becomes larger the further the printing heads are separated from each other. In the case illustrated in FIG. 12A, a state in which the shifting between the printing position of printing head 1 and the printing position of printing head 4 is a maximum is presumed. However, the amount that fluctuation in the density and fluctuation in the hue due to a shift in the printing position stands out differs depending on the combination of ink colors.

Therefore, in the case of a combination of printing heads for which fluctuation in the density and fluctuation in the hue due to a shift in the printing position stands out easily, it is preferred that dither patterns be prepared that will make it difficult for this fluctuation to stand out even when shifting of the dot arrangement occurs due to shifting of the printing position. In this variation, an example of using cyan and magenta will be explained.

FIG. 7 will be used as a reference again. In this variation, the flow from step S1 to step S3 is the same as in FIG. 7. Moreover, the processing in step S1 in FIG. 7 is the same, so an explanation of the step will be omitted. On the other hand, in this variation, the processing of steps S2 and S3 in FIG. 7 differ. More specifically, in the first embodiment, in the intermediate- to high-gradation ranges, a cyan dither pattern and magenta dither pattern were individually created, however, in this variation, a cyan dither pattern and magenta dither pattern are created so as to be correlated with each other.

In step S2 in FIG. 7, intermediate-level threshold values (S+1 to H) are set. The pixels for which the intermediate-level threshold values S+1 to H are set are pixels for which dots are printed for data having intermediate gradation or greater. In the case where the input image data is for an image having intermediate density that indicates gradation values in the range S+1 to H (first gradation), dots are printed for pixels for which threshold values that are equal to or less than those gradation values are set. In an image having this kind of intermediate density, dots are also printed for surrounding pixels having low-gradation level threshold values 1 to S, and on the sheet surface, dots are applied plural times, so overlapping pixels occur.

This kind of intermediate-gradation range is a gradation range in which the dot coverage and image density fluctuate the easiest due to shifting of the printing position. Therefore, in this embodiment, in order to suppress density fluctuation due to shifting of the printing position, S+1 to H threshold values are set so that the number of overlapping dots is suitably adjusted.

Figure 6:
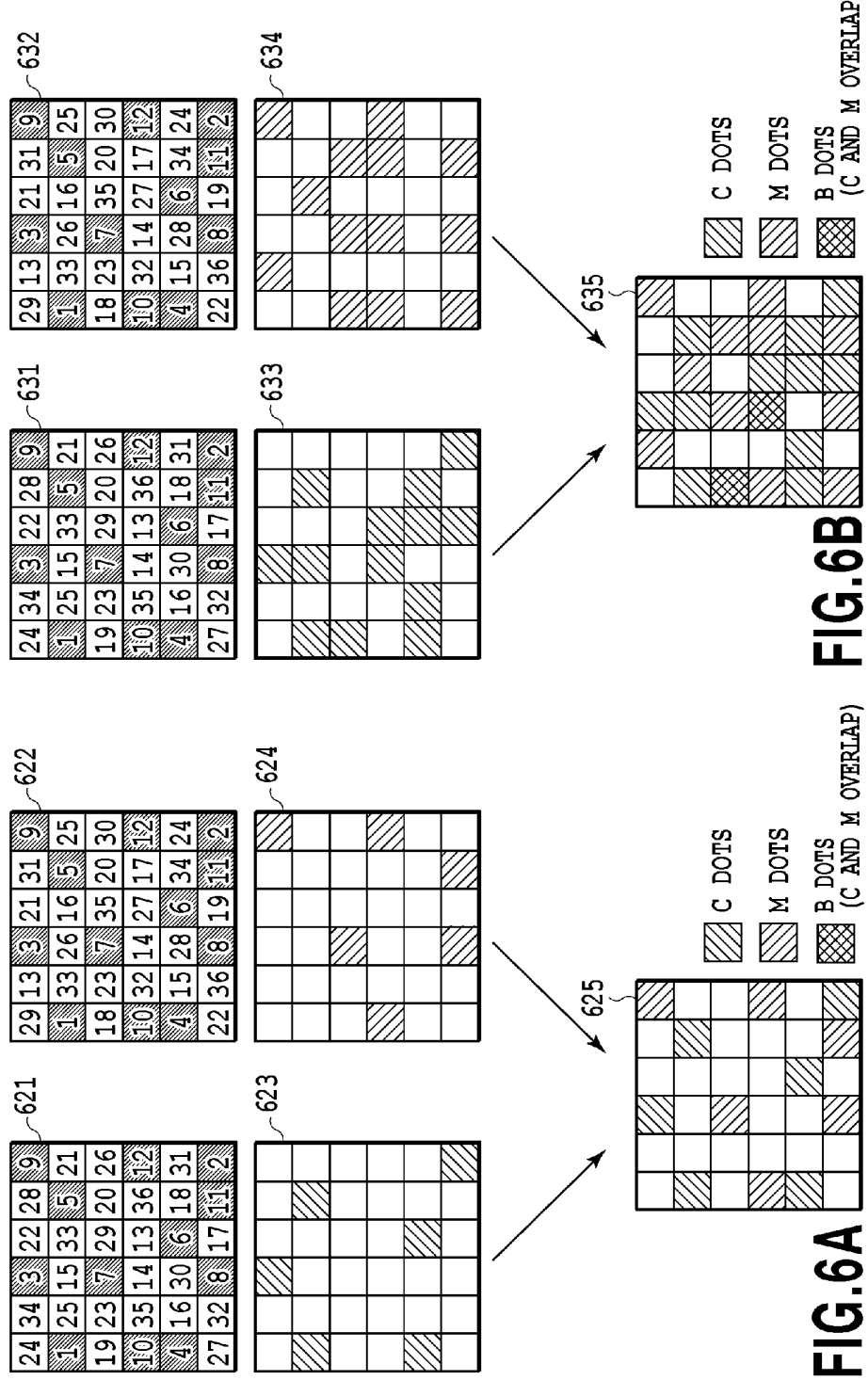
FIG. 6A is a schematic diagram for explaining the quantization result.
FIG. 6B is a schematic diagram for explaining the quantization result.
Figure 13:
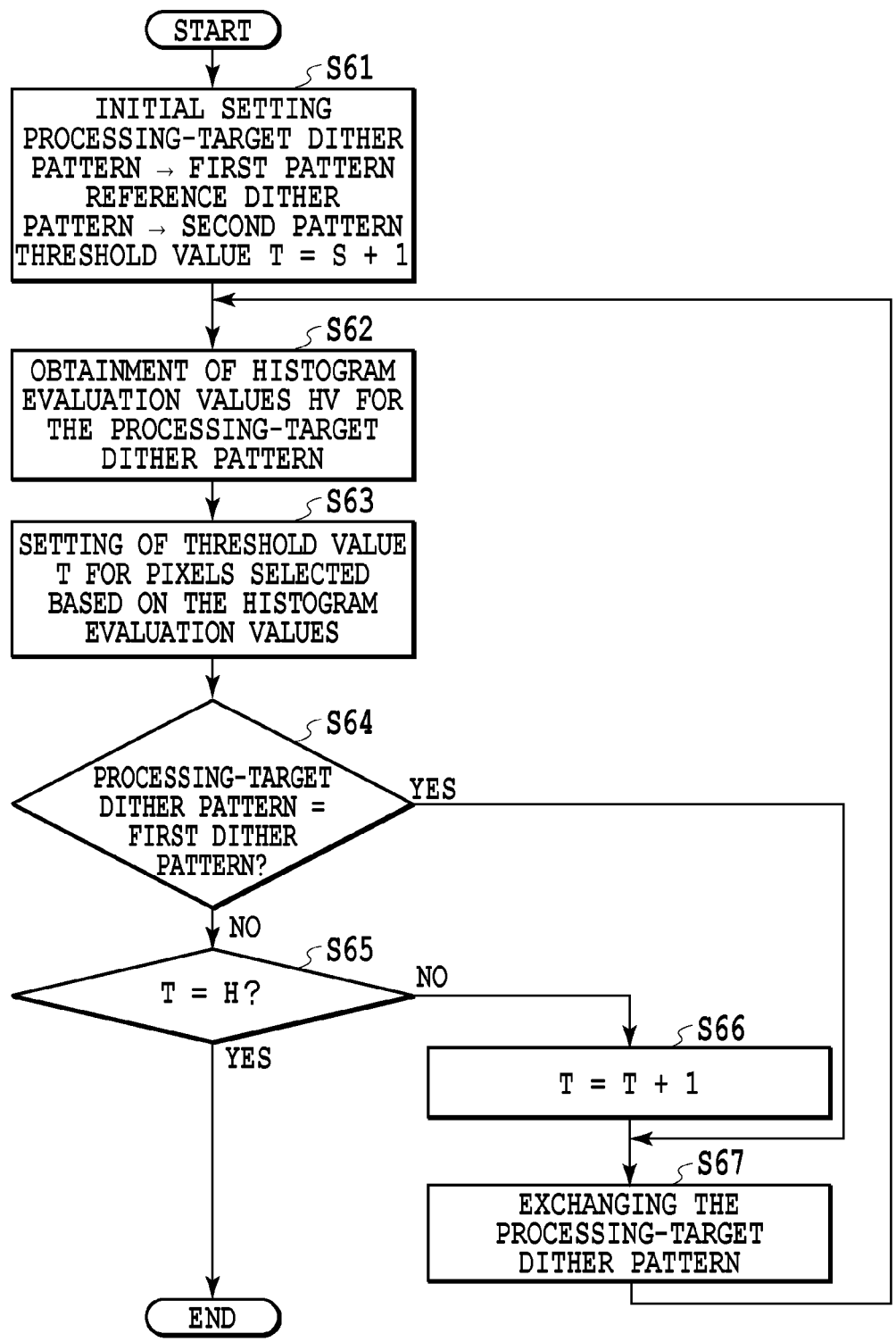
FIG. 13 is a flowchart illustrating the flow up to setting intermediate-level threshold values.

FIG. 13 is a flowchart for explaining the process for setting the intermediate-level threshold values (S+1 to H) inside the dither patterns in step S2 in FIG. 6. After this process is started, first, in step S61, specified initial settings are performed. More specifically, in step S61, the cyan dither pattern, which is the first dither pattern for which the threshold values 1 to S are already set, is set as the processing-target dither pattern, and the magenta dither pattern, which is the second dither pattern, is set as a reference dither pattern. Moreover, the threshold value T that is set next is set to S+1.

In step S62, histogram evaluation values HV are found in the processing-target dither pattern with respect to the reference dither pattern. Here, the histogram evaluation values indicate the distribution in the direction in which pixels for which threshold values are set are arranged continuously in two dither patterns. Histogram evaluation values will be explained in detail below.

FIG. 14 is a drawing for explaining an example of histogram evaluation values. Three types of histograms of the processing-target dither pattern 141 are illustrated with respect to the pixels for which threshold values have been set (print pixels) in the reference dither pattern 142. For example, in Table 1 in FIG. 14, a certain print pixel in the processing-target dither pattern 141 is taken as a reference, and the print pixels of pixel areas that are adjacent on the top, bottom, left and right are counted.

For example, when a print pixel in the reference dither pattern 142 exists in the pixel adjacent in the top direction with respect to the reference pixel, only 1 is added to the "top" field in the table. Moreover, when a print pixel in the reference dither pattern 142 exists in the pixel adjacent in the right direction with respect to the reference pixel, only 1 is added to the "right" field in the table, and similarly when a print pixel in the reference dither pattern 142 exists in the pixel in the same position, only 1 is added to the "same" field in the table. The result of adding these kinds of count values to all of the pixels in the processing-target dither pattern 141 is called a histogram.

In this way, a histogram is used as a list of counted values that are correlated to relative positions of print pixels with respect to the reference pixels.

Here, in addition to a first histogram (cyan dither pattern with respect to the magenta dither pattern) of this kind of histogram, a second histogram (magenta dither pattern with respect to the cyan dither pattern) is also prepared. These histograms are updated each time the pixels for which threshold values are set (print pixels) are newly set.

FIG. 13 will be referred to again. In step S63 in FIG. 13, one pixel is selected from among the pixels in the processing-target dither pattern for which a threshold value is not yet set so that the histogram distribution is set as much as possible to being uniform, and threshold value T is set.

For example, when the fields "top", "bottom", "left" and "same" are all 2, and the field "right" is 1, a pixel such as where a print pixel of the reference dither pattern exists in the pixel adjacent to the right becomes the pixel that is set to the threshold value T of the processing-target dither pattern. When doing this, as long as the print pixels are preferentially set in positions so that the histogram distribution is as close as possible to being uniform, it is not absolutely necessary to increase the count value of the field having the lowest count value.

In step S64, it is determined whether or not the current processing-target dither pattern is the first dither pattern. When the current processing-target dither pattern is the first dither pattern, then in step S67 the processing-target dither pattern is exchanged. Here, the processing-target dither pattern changes from the first dither pattern to the second dither pattern. Processing then returns to step S122.

On the other hand, in step S64 when the current processing-target dither pattern is determined not to be the first dither pattern, processing advances to step S65, and it is determined whether or not the threshold value T that was set in step S63 is T=H. When T=H, this processing ends. When T<H, then in step S66, the threshold value T is incremented, and in step S67 the processing-target dither pattern is exchanged. Here, the processing-target dither pattern changes from the second dither pattern to the first dither pattern. Processing then returns to step S122.

Figure 15:
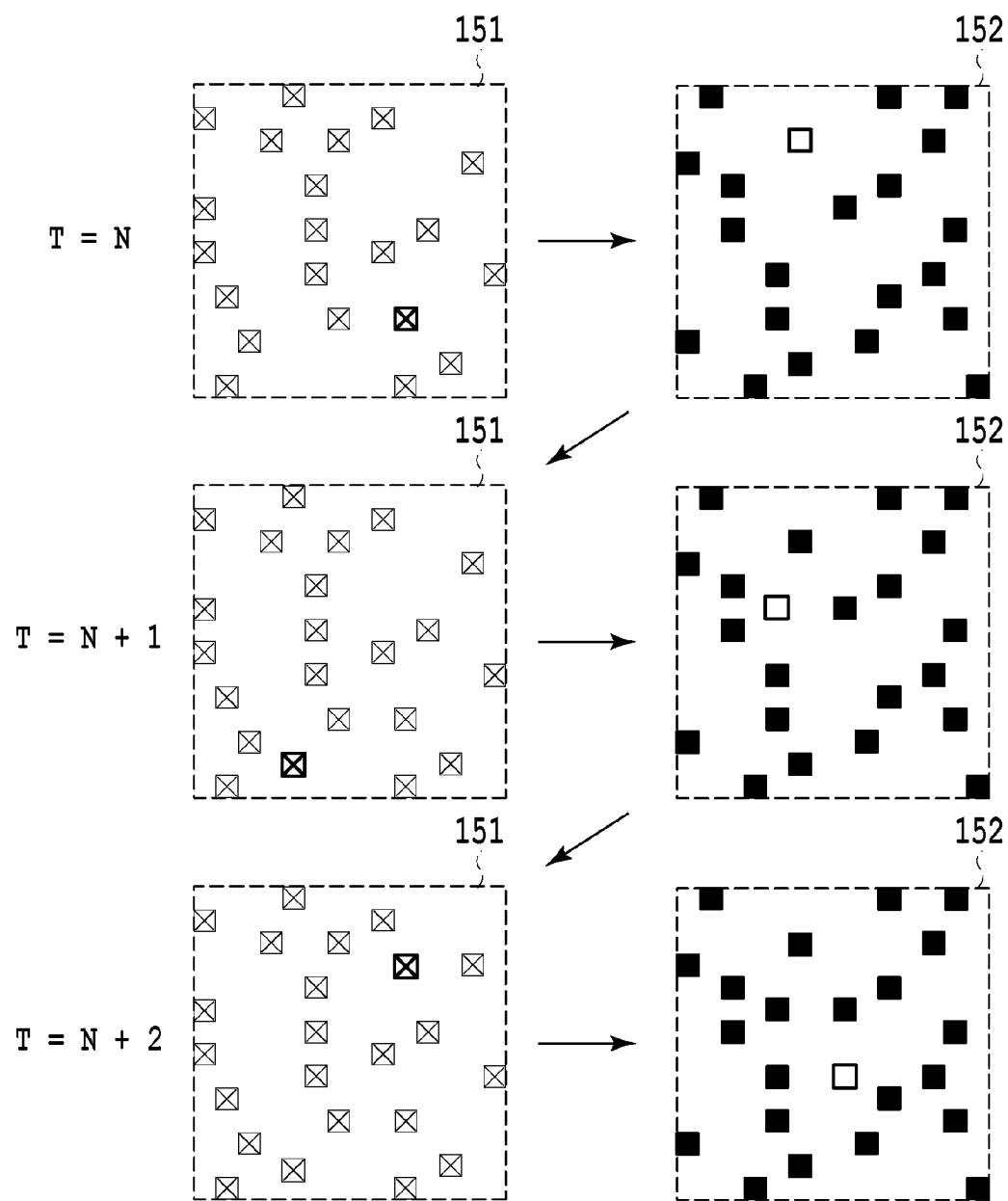
FIG. 15 is a drawing for explaining the state when the print pixels are set.

FIG. 15 is a drawing for explaining the state as the print pixels (pixels for which threshold values are set) are set for the cyan dither pattern (first dither pattern) 151 and magenta dither pattern (second dither pattern) 152 in an alternating manner according to the flowchart in FIG. 13. In FIG. 15, the outline squares indicate pixels for which threshold values have been newly set. As illustrated in FIG. 15, in the cyan dither pattern 151 and magenta dither pattern 152, as the threshold values advances from N to N+1 to N+2, print pixels are set one at a time so that as much as possible there is no deviation in adjacent positions on the top, bottom, right and left.

Figure 16:
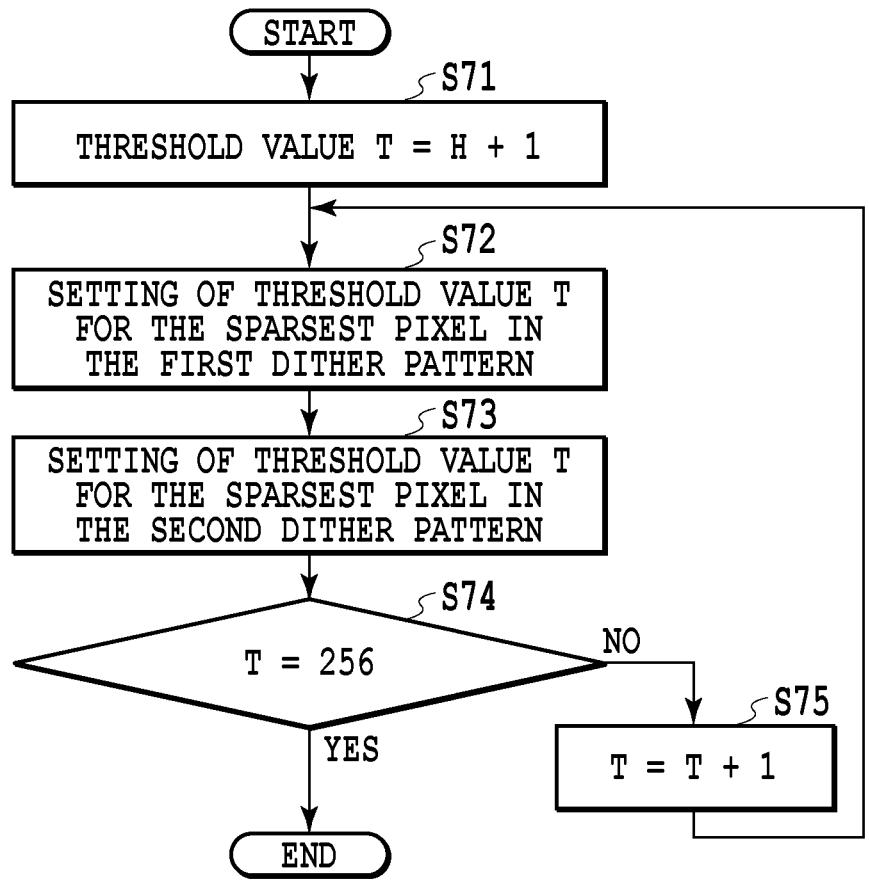
FIG. 16 is a flowchart illustrating the flow up to setting high-level threshold values.

FIG. 16 is a flowchart for explaining a process for setting high-level threshold values (H+1 to 256) inside the dither patterns in step S3 in FIG. 7. After this processing begins, first, in step S71, the threshold value to be set next is set to T=H+1.

Continuing, in step S72, the pixel that is the "sparsest" is selected in order from among the pixels for which a threshold value has not yet been set in the cyan dither pattern which is the first dither pattern, and the threshold value T is set. Similarly, in step S73, the pixel that is the "sparsest" is selected in order from among the pixels for which a threshold values has not yet been set in the magenta dither pattern which is the second dither pattern, and the threshold value T is set.

In step S74 it is determined whether or not T=256, and when T<256, there is still threshold values to be set, so in step S75 the threshold value T is incremented, after which processing returns to step S72. On the other hand, in step S74, when T=256, then all of the threshold values have been set and this processing ends.

Here, for threshold values 1 to S, the same threshold values are set in the same positions in both the cyan dither pattern and the magenta dither pattern. In step S72 and step S73, threshold values S+1 to H are set in order for cyan and magenta while referencing each other's histograms and using similar processing. Therefore, for threshold values S+1 to H, different values are set in the same positions.

By using two dither patterns that were created in correlation with each other using the method explained above, it becomes possible to output an image for which density fluctuation due to shifting of the printing position in the intermediate-gradation range has been suppressed.

Here, in referencing FIG. 14 again, the histogram of Table 1 that was explained in the example above counts the number of print pixels that are adjacent in the top, bottom, left and right directions. With this kind of histogram, separation of overlapping dots and overlapping of adjacent dots can be made about the same even when shifting of the printing position occurs in any direction, so this kind of histogram is useful in the case where shifting of the printing position easily occurs equally in the top, bottom, left or right direction.

On the other hand, in the case where shifting in the printing position easily occurs mainly in the conveying direction (up-down direction), a histogram is useful that counts two pixels that are adjacent successively in the up-down direction such as in Table 2 in FIG. 14.

Moreover, in the case where shifting of the printing position easily occurs in all directions including the diagonal direction, it is also possible to count for a 3×3 pixel area with a print pixel at the center as in Table 3 in FIG. 14. Furthermore, it is also possible to perform specified weighting of individual count values according to shifting direction and shifting amount, and to set threshold values T for pixels so that each of the count values are as uniform as possible after the weighting process. In any case, a histogram for a suitable area should be used according to the direction and amount of shifting of the printing position of the printing apparatus 10.

Shifting of the printing position such as described above may differ according to the type of printing medium 6 or the printing mode. Therefore, a histogram is prepared to correspond to each mode, and according to this, by creating plural dither patterns and storing them in the printing apparatus 10 in advance, it is possible to perform quantization processing using the most suitable dither patterns in any printing mode.

Figure 17:
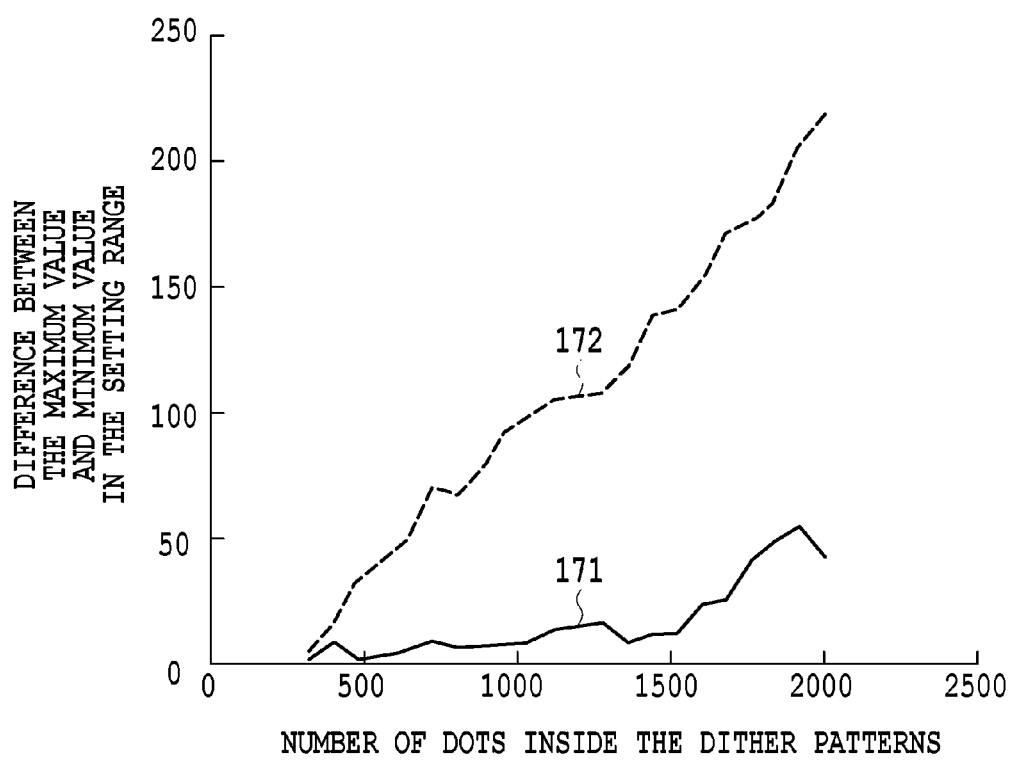
FIG. 17 is a graph comparing deviations in histograms.

FIG. 17 is a graph that compares the deviation of the histogram for a 64×64 pixel area for the case in which the print pixels of two dither patterns are set using the histogram in Table 1 in FIG. 14, and the case in which print pixels are set with no correlation. In this graph, the horizontal axis indicates the number of print pixels in a 64×64 pixel area, and the vertical axis indicates the difference between the maximum value and minimum value of the count number in the histogram. The larger the difference between the maximum value and minimum value is, the larger the deviation of the histogram is.

In the case in which two dither patterns are created having no correlation, the difference between the maximum value and the minimum values is approximately 10% of the total number of pixels such as indicated by the dashed line 172. When this amount of difference occurs, a granular feeling may be visually noticeable depending on the color of ink. On the other hand, when two dither patterns are created so that the deviation of the histogram is as small as possible, the difference in the maximum value and the minimum value can be kept to less than 10% the total number of pixels such as indicated by the solid line 171. Therefore, it is possible to suppress a granular feeling so as not to be visually noticeable, regardless of the color of ink.

As described above, in the low-gradation range, dither masks that combine robustness against mechanical precision together with dispersibility of dots during two-color printing are used. Furthermore, in the intermediate-gradation range, paying attention to the overlapping of dots between masks of two colors, dither masks having high robustness against conveyance error are used so that the rate of change of overlapping dots is made low. As a result, in this variation, it is possible to obtain an image in which a granular feeling during one-color printing and two-color printing is reduced. Furthermore, by increasing the robustness against shifting of the mechanical precision more than in the first embodiment, it is possible to stably print an image for which a granular feeling has been further reduced.

FIG. 18A to FIG. 18D are drawings illustrating threshold values and dot arrangement. As illustrated in FIG. 18A, in the first embodiment, the case was explained in which for the input data up to B_in×2, control is performed so that 1 to B_in is used for cyan, and (B_in+1) to (B_in×2) is used for magenta, however, the embodiment is not particularly limited to this. As illustrated in FIG. 18B, cyan and magenta can be reversed.

Moreover, as illustrated in FIG. 18C, it is also possible to perform control so that in the range up to B_in×2 odd numbered threshold values are assigned to cyan, and even numbered threshold values are assigned to magenta. The opposite is also possible. In this way, the threshold values can be assigned in an alternating manner in the order of gradation. Furthermore, as illustrated in FIG. 18D, it is also possible to perform control so that in the range up to B_in×2 threshold values can be assigned at random as long as in the end there are the same number of threshold values for both cyan and magenta.

In the explanation up to this point, it was explained that by making the patterns the same up to the threshold values 1 to B_max×2, graininess is improved. However, even if a pattern up to the threshold values 1 to B_max×2 do not coincide, there is the case in which the granularity is maintained. An example of that is illustrated in FIG. 19.

Figure 19:
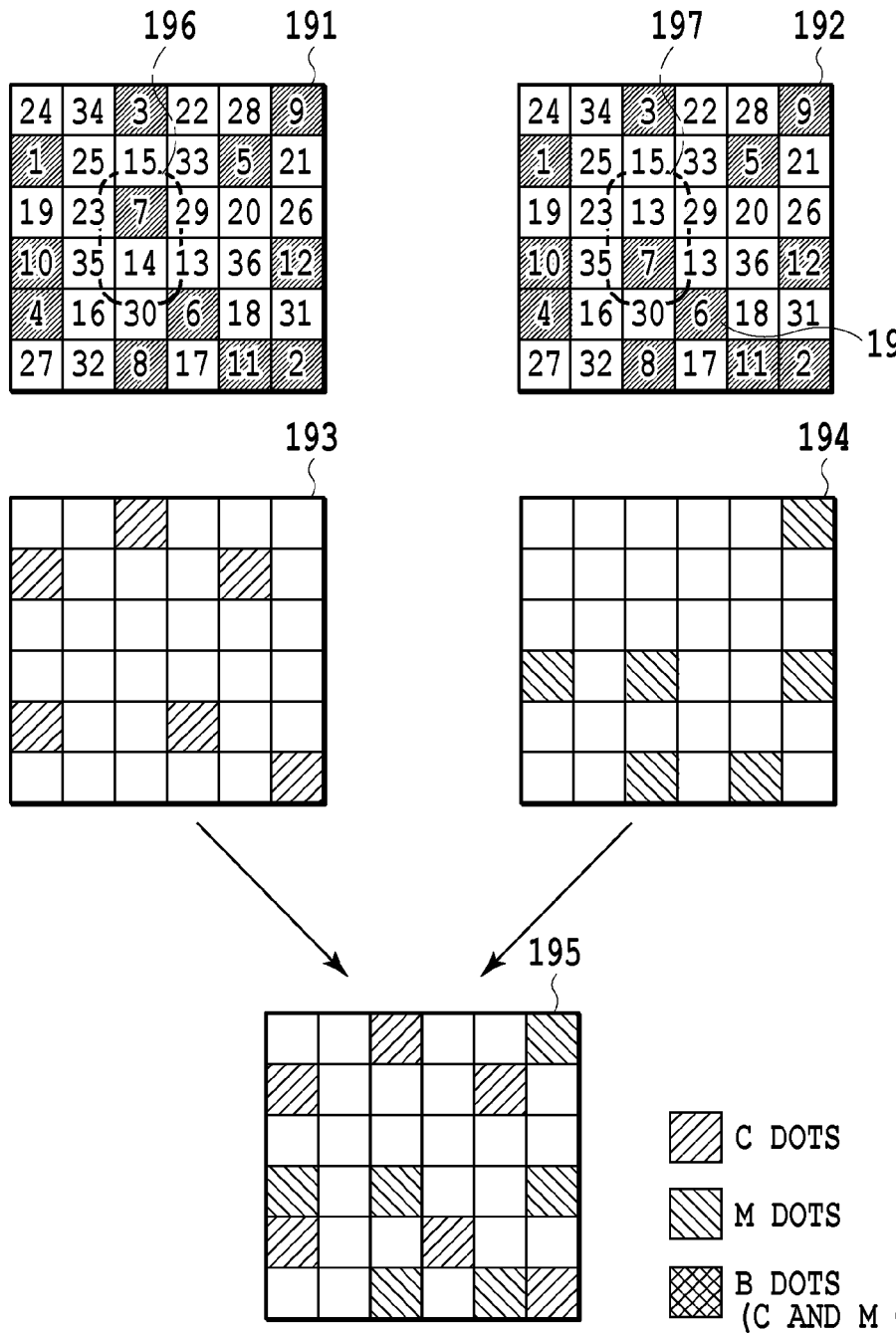
FIG. 19 is a schematic diagram for explaining quantization results.

FIG. 19 is a schematic drawing for explaining the result of quantization. The cyan dither mask 191 and the magenta dither mask 192 are such that the locations of threshold value 7 in pixel 196 and pixel 197 that are surrounded by the dotted line in the figure differ. In this case, the distance between the cyan threshold value 7 (pixel 196) and magenta threshold value 7 (pixel 197) is closer than the distance between the magenta threshold value 7 (pixel 197) and the closest magenta threshold value 6 (pixel 198). In this way, by considering making the distance between dots of the same color greater than the distance between dots of different colors, it is possible not to increase the graininess in comparison with the conventional methods.

Second Embodiment

In this embodiment, an embodiment that is suitable for quantization to three values or more will be explained. In the following, the flow of a dither process for an example of five values will be explained. The other parts are the same as in the first embodiment, so an explanation thereof will be omitted.

Figure 20:
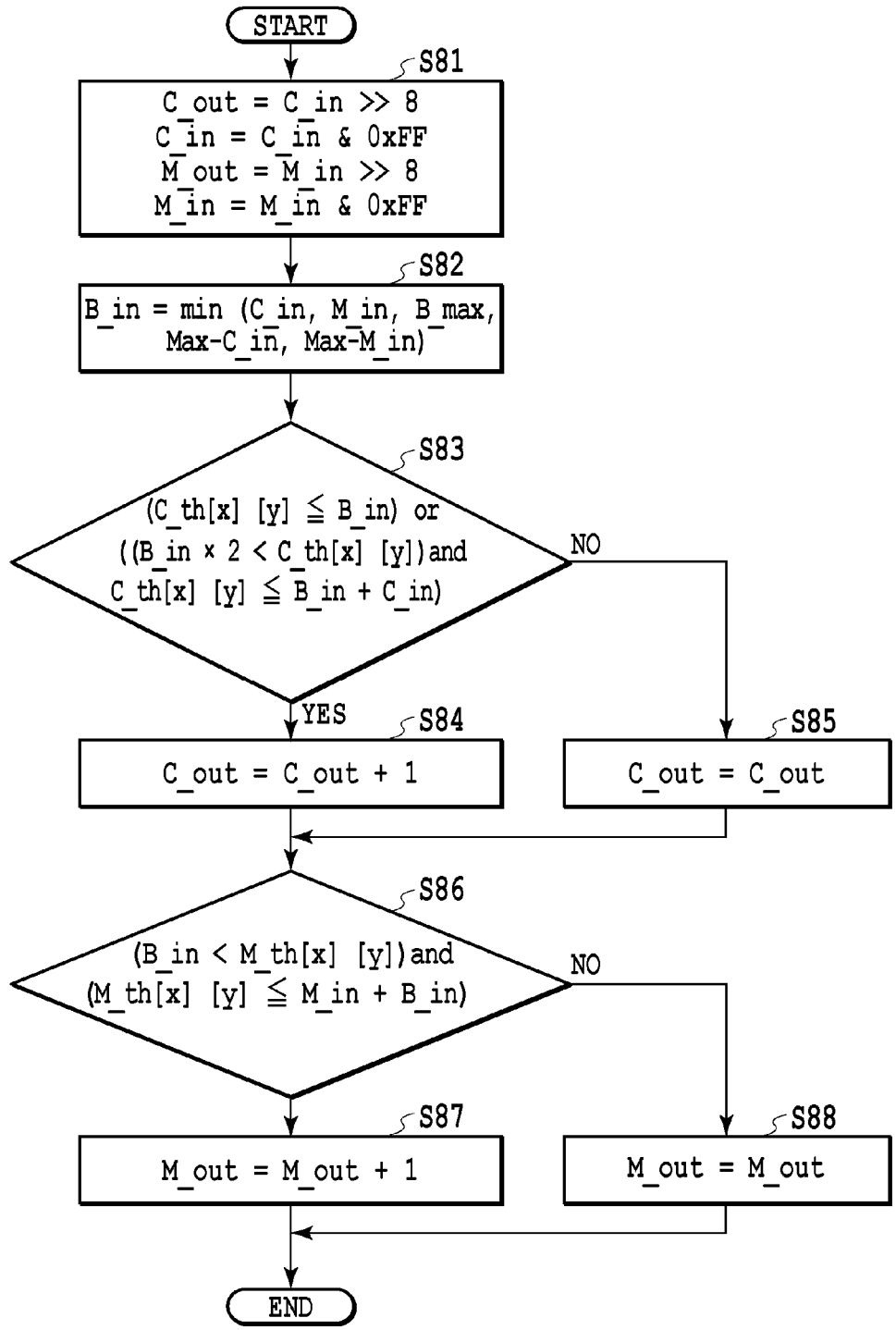
FIG. 20 is a flowchart illustrating the flow of the dither process of a second embodiment.

FIG. 20 is a flowchart that illustrates the flow of the dither process of this embodiment. In FIG. 20, the following parts are different from the processing in FIG. 11 described above.

The input values for C_in and M_in are 10-bit signal values 0 to 1023.

The output values for C_out and M_out are the five values 0 to 4.

The other points are the same as in FIG. 11.

As illustrated in FIG. 20, first, in step S81, initial values (initial quantization data) are set for C_out and M_out. In this embodiment, the upper 2 bits of C_in and M_in will be used. In other words, 0 to 255 are 0, 256 to 511 are 1, 512 to 767 are 2 and 768 to 1023 are 3. Moreover, the lower 8 bits of C_in and M_in are used as fractions, and those are set as C_in and M_in.

In step S82 and later, dithering is performed on the fraction portion C_in, M_in (fraction data). In step S82, when acquiring B_in, the minimum value among C_in, M_in, B_max, Max-C_in and Max-M_in is used. Here, Max is the maximum value that can be input as C_in or M_in, and in this embodiment is 255.

Step S83 is the same as the processing in step S52 in FIG. 11, so an explanation is omitted. When the judgment result in step S83 is YES, processing advances to step S84, and the cyan quantization data is taken to be C_out=C_out+1. When the judgment result is NO, processing advances to step S85, and in this case the cyan quantization data does not change.

Step S86 is the same as step S55 in FIG. 6, so an explanation is omitted. When the judgment result of step S86 is YES, processing advances to step S87, and the magenta quantization data is taken to be M_out=M_out+1. When the judgment result is NO, processing advances to step S88, and in this case the magenta quantization data does not change. This processing then ends.

Here, the reason for making the method for acquiring B_in in step S82 in the flow in FIG. 20 different than that in step S51 in FIG. 11 of the first embodiment will be explained.

In the first embodiment, B_in was acquired from C_in, M_in and B_max. When trying to acquire B_in in this way in this embodiment as well, when C_in=255, M_in=255 and B_max=8, for example, the effective threshold value range in step S83 becomes 1 to 8 and 17 to 264. However, the threshold value range that can be set as a dither mask is 1 to 256, so actually the effective threshold value range is up to 256. Similarly, in step S86, the effective threshold value range is 9 to 264, however, similarly, the actual effective threshold value range is up to 256.

In other words, the maximum density that is finally printed inside the dither pattern is reduced to (Max-B_max)/Max. This becomes a problem in that, in the case of two values the maximum density becomes lower, and in the case of converting to multiple values the gradation cannot be reproduced and discontinuity of the gradation occurs. In order to solve this problem, in this embodiment, the maximum value acquired as B_in is limited to Max-C_in or Max-M_in. As a result, it is possible to keep the maximum value of the threshold value range to 256 in step S83 and step S86.

By using the dithering method described above, it is possible to output an image with reduced graininess and density fluctuation at high speed and low cost even when dithering is performed for multiple values as in this embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206325, filed Oct. 1, 2013, which is hereby incorporated by reference herein in its entirety.

What is claimed is:

1. An image processing apparatus comprising:
an acquisition unit configured to acquire first multi-value data and second multi-value data based on input image data; and
a generation unit configured to generate first binary data and second binary data for printing dots by performing quantization processing using a dithering method on the first multi-value data and the second multi-value data; wherein
a first dither pattern that is used for the first multi-value data and a second dither pattern that is used for the second multi-value data have same threshold values that are set for same pixels in a first gradation range, and have different threshold values that are set for same pixels in a second gradation range that exceeds the first gradation range; and
the generation unit
sets a first threshold value for forming dots of the first dither pattern based on the first multi-value data and the second multi-value data, and generates the first binary data according to whether or not a threshold value corresponding to a target pixel of the first dither pattern is included in the first threshold value, and
sets a second threshold value for forming dots of the second dither pattern based on the second multi-value data and the first multi-value data, and generates the second binary data according to whether or not a threshold value corresponding to a target pixel of the second dither pattern is included in the second threshold value.

2. The image processing apparatus according to claim 1, wherein the first threshold value and the second threshold value in the first gradation range are different from each other.

3. The image processing apparatus according to claim 2, wherein continuous threshold values are included in the first threshold value and the second threshold value in the first gradation range in an alternating manner in order of gradation.

4. The image processing apparatus according to claim 2, wherein plural threshold values are set at random in the first threshold value and the second threshold value in the first gradation range so that the number of threshold values included is the same.

5. The image processing apparatus according to claim 1, wherein a range of the first threshold value and a range of the second threshold value in the second gradation range have overlapping ranges.

6. The image processing apparatus according to claim 1, wherein
a range of the first threshold value is a range of a specified value or less, and is a range from the specified value×2+1 or greater to the specified value+a value of the first multi-value data; and
a range of the second threshold value is a range from the specified value+1 or greater to the specified value+a value of the second multi-value data.

7. The image processing apparatus according to claim 6, wherein the specified value is acquired from a value of the first multi-value data, a value of the second multi-value data, and a specified threshold value.

8. The image processing apparatus according to claim 6, wherein the specified value is acquired from a value of the first multi-value data, a value of the second multi-value data, a specified threshold value, a maximum value that can be inputted as the first multi-value data, and a maximum value that can be inputted as the second multi-value data.

9. The image processing apparatus according to claim 1, wherein the ratio of the number of pixels for which the first binary data and the second binary data are both data indicating dot printing is greater in the second gradation range than in the first gradation range.

10. An image processing apparatus, comprising:
an acquisition unit configured to acquire first multi-value data and second multi-value data based on input image data;
a fractional data generation unit configured to generate first initial quantization data from the first multi-value data and first fraction data corresponding to fractions excluding the first initial quantization data from the first multi-value data, and generate second initial quantization data from the second multi-value data and second fraction data corresponding to fractions excluding the second initial quantization data from the second multi-value data; and
a quantization data generation unit configured to generate first quantization data and second quantization data for printing dots by performing quantization processing using a dithering method on the first fraction data and the second fraction data; wherein a first dither pattern that is used for the first fraction data and a second dither pattern that is used for the second fraction data have same threshold values that are set for same pixels in a first gradation range, and have different threshold values that are set for same pixels in a second gradation range that exceeds the first gradation range; and the quantization data generation unit sets a first threshold value in the first dither pattern based on the first fraction data and the second fraction data, and generates the first quantization data based on whether or not the first fraction data is included in the first threshold value range, and based on the first initial quantization data; and sets a second threshold value in the second dither pattern based on the second fraction data and the first fraction data, and generates the second quantization data based on whether or not the second fraction data is included in the second threshold value, and based on the second initial quantization data.

11. The image processing apparatus according to claim 10, wherein the first threshold value and the second threshold value in the first gradation range are different from each other.

12. The image processing apparatus according to claim 11, wherein continuous threshold values are included in the first threshold value and the second threshold value in the first gradation range in an alternating manner in order of gradation.

13. The image processing apparatus according to claim 11, wherein plural threshold values are set at random in the first threshold value and the second threshold value in the first gradation range so that the number of threshold values included is the same.

14. The image processing apparatus according to claim 10, wherein a range of the first threshold value and a range of the second threshold value in the second gradation range have overlapping ranges.

15. The image processing apparatus according to claim 10, wherein a range of the first threshold value is a range of a specified value or less, and is a range from the specified value×2+1 or greater to the specified value+a value of the first multi-value data; and a range of the second threshold value is a range from the specified value+1 or greater to the specified value+a value of the second multi-value data.

16. The image processing apparatus according to claim 15, wherein the specified value is acquired from a value of the first fraction data, a value of the second fraction data, and a specified threshold value.

17. The image processing apparatus according to claim 15, wherein the specified value is acquired from a value of the first fraction data, a value of the second fraction data, a specified threshold value, a maximum value that can be inputted as the first fraction data, and a maximum value that can be inputted as the second fraction data.

18. A method for image processing, comprising an acquisition step of acquiring first multi-value data and second multi-value data based on input image data; and a generation step of generating first binary data and second binary data for printing dots by performing quantization processing using a dithering method on the first multi-value data and the second multi-value data; wherein a first dither pattern that is used for the first multi-value data and a second dither pattern that is used for the second multi-value data have same threshold values that are set for same pixels in a first gradation range, and have different threshold values that are set for same pixels in a second gradation range that exceeds the first gradation range; and in the generation step, a first threshold value for forming dots of the first dither pattern is set based on the first multi-value data and the second multi-value data, and the first binary data is generated according to whether or not threshold value corresponding to a target pixel of the first dither pattern is included in the first threshold value range, and a second threshold value for forming dots of the second dither pattern is set based on the second multi-value data and the first multi-value data, and the second binary data is generated according to whether or not threshold value corresponding to a target pixel of the second dither pattern is included in the second threshold value range.

19. The method for image processing according to claim 18, wherein the first threshold value and the second threshold value in the first gradation range are different from each other.

20. The method for image processing according to claim 19, wherein continuous threshold values are included in the first threshold value and the second threshold value in the first gradation range in an alternating manner in order of gradation.

* * * * *